Nov. 7, 1944.     R. B. LEECH     2,361,950
COATING APPARATUS
Filed April 15, 1941     13 Sheets-Sheet 6
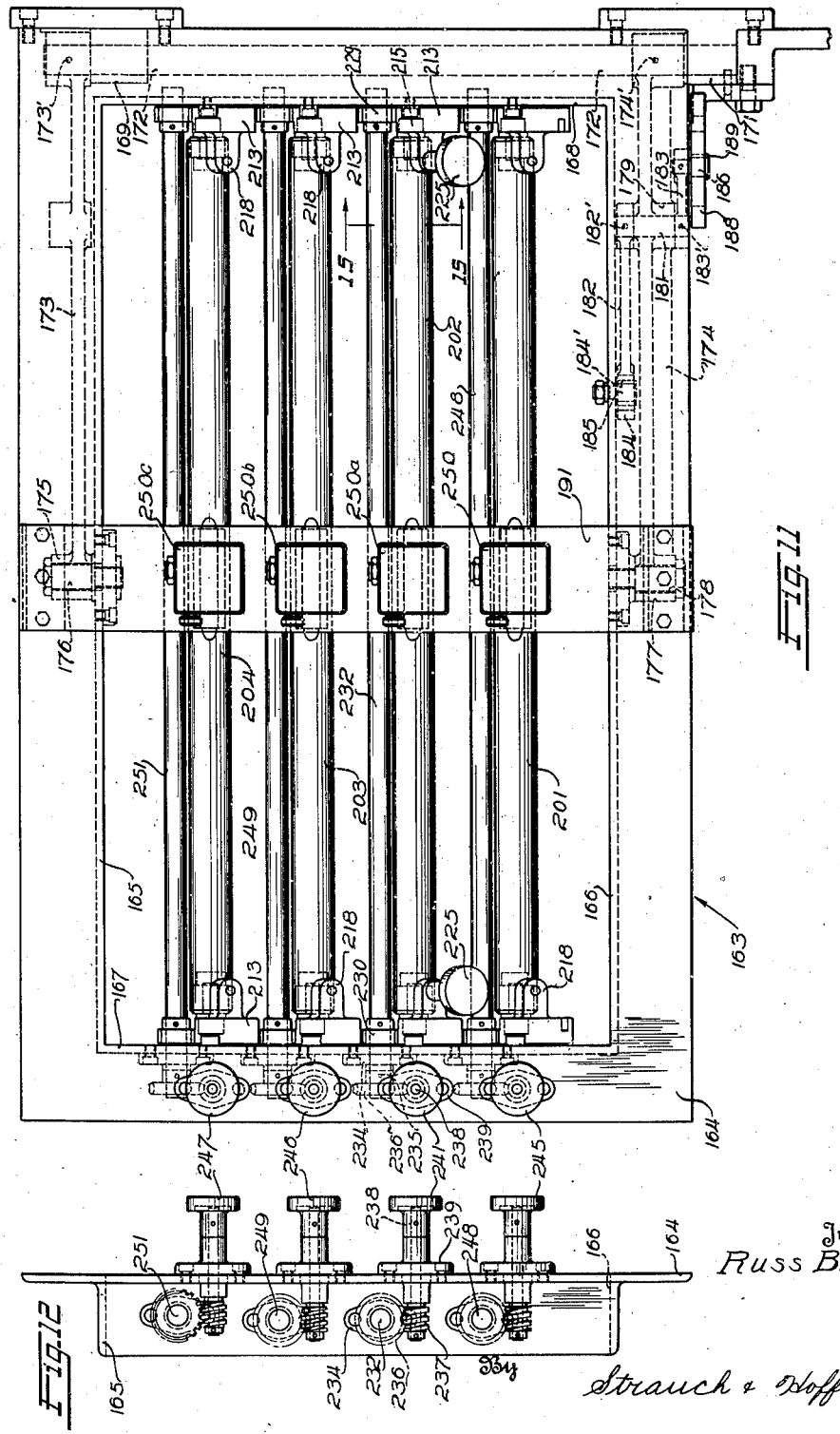
Inventor
Russ B. Leech
By
Strauch & Hoffman
Attorneys Nov. 7, 1944.    R. B. LEECH    2,361,950
COATING APPARATUS.
Filed April 15, 1941    13 Sheets-Sheet 7

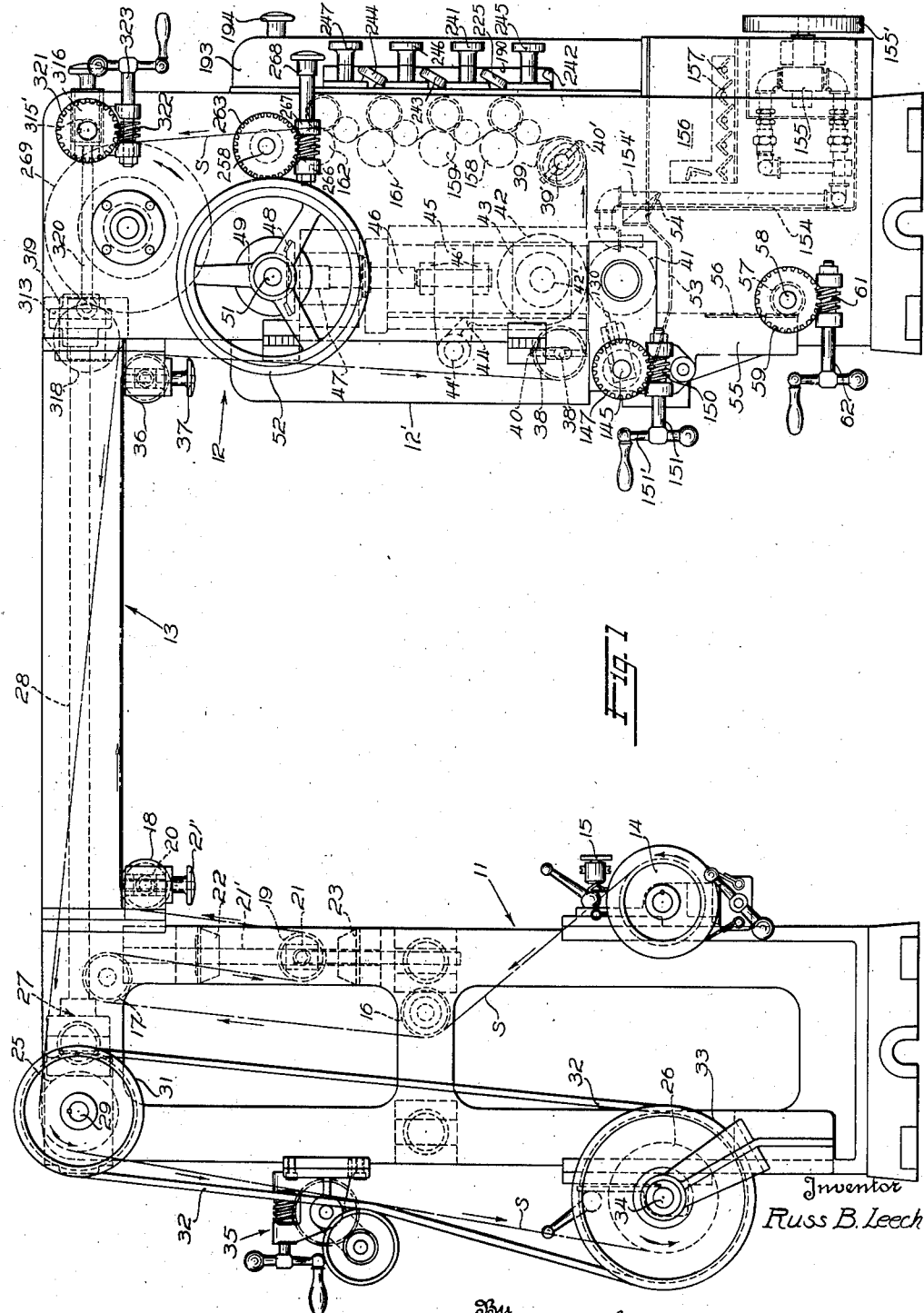

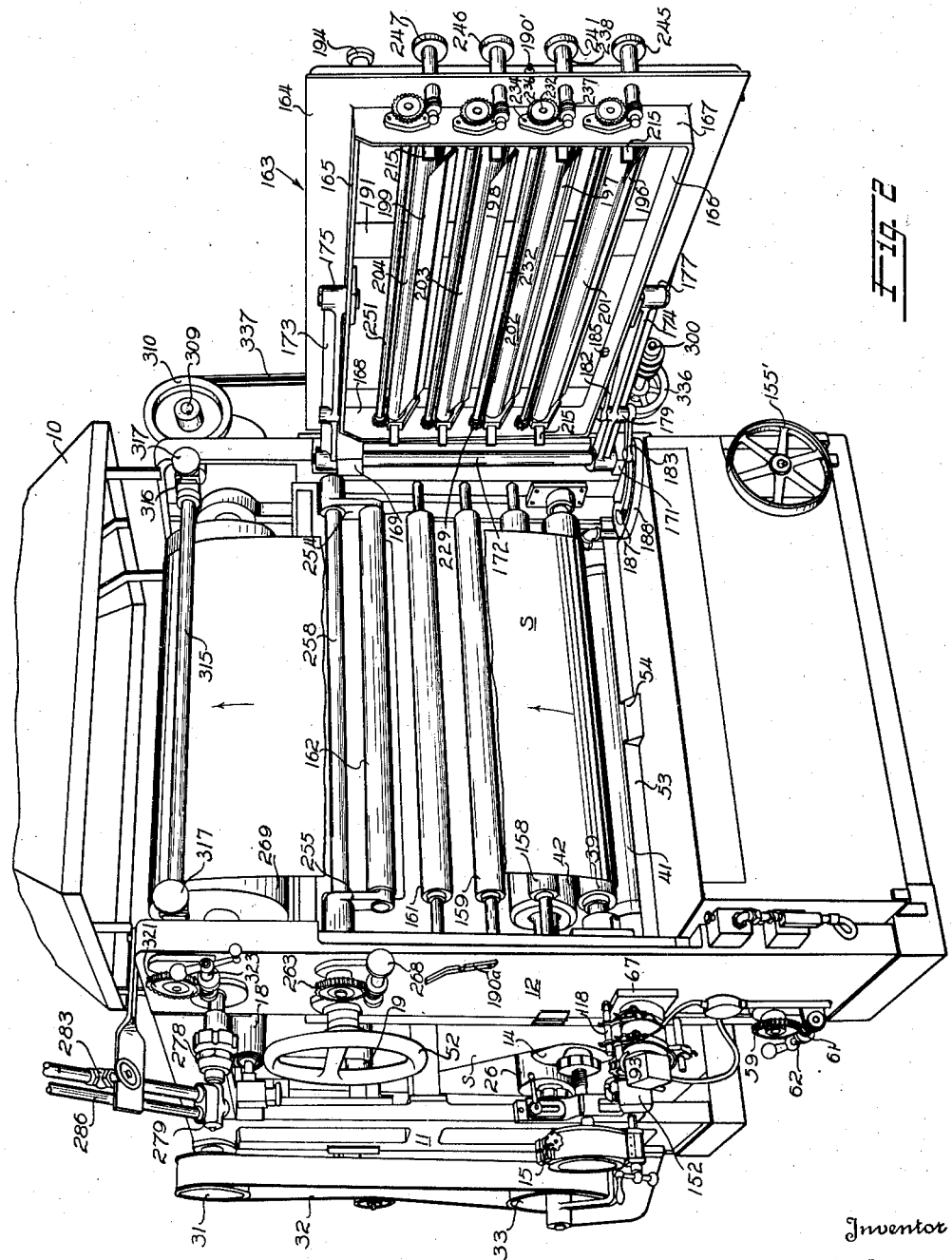

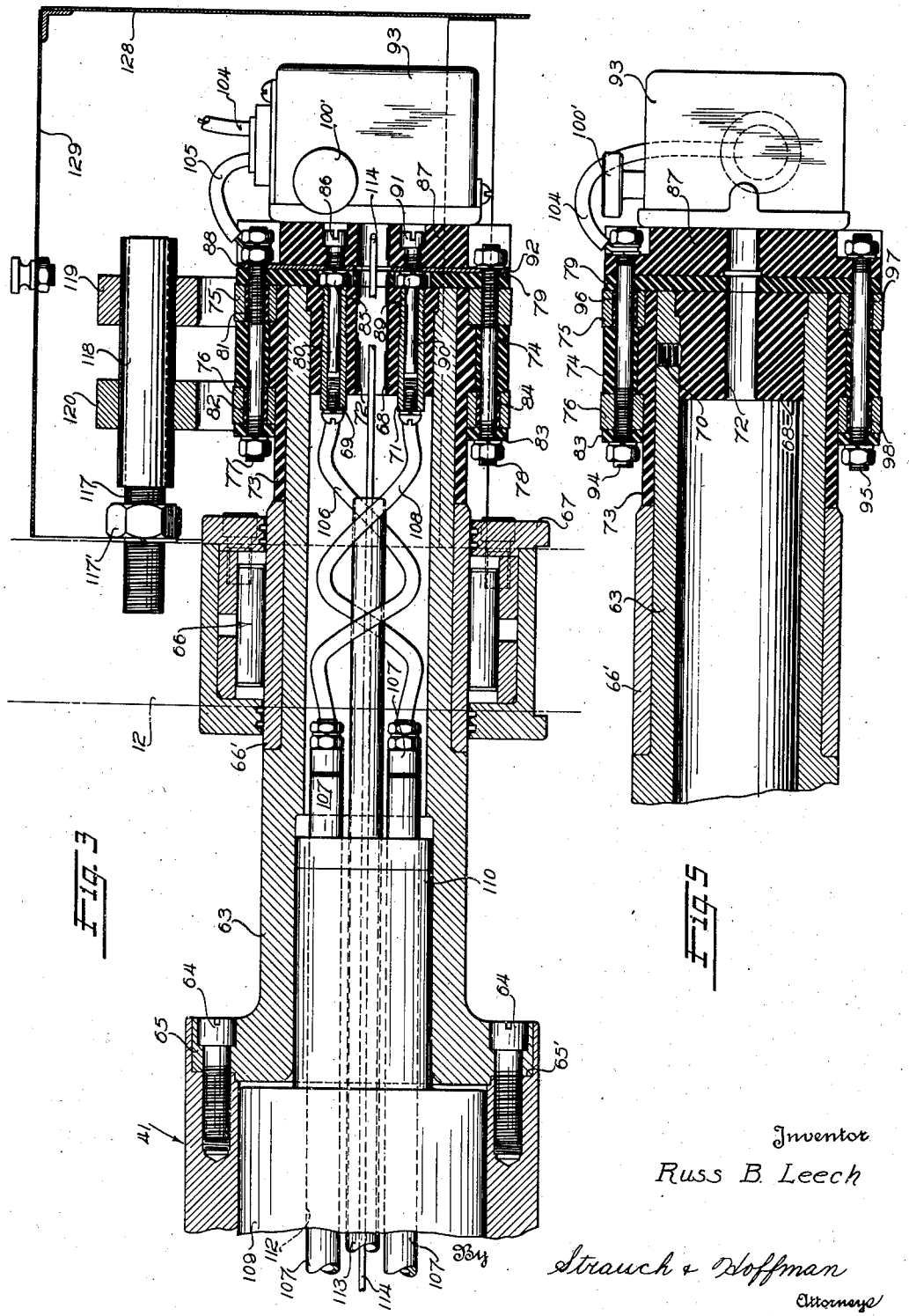

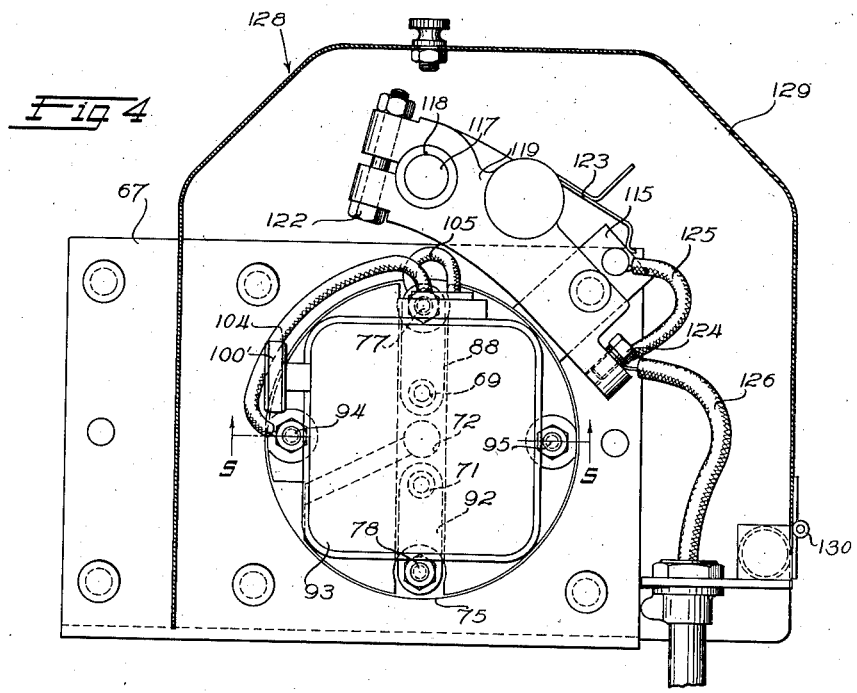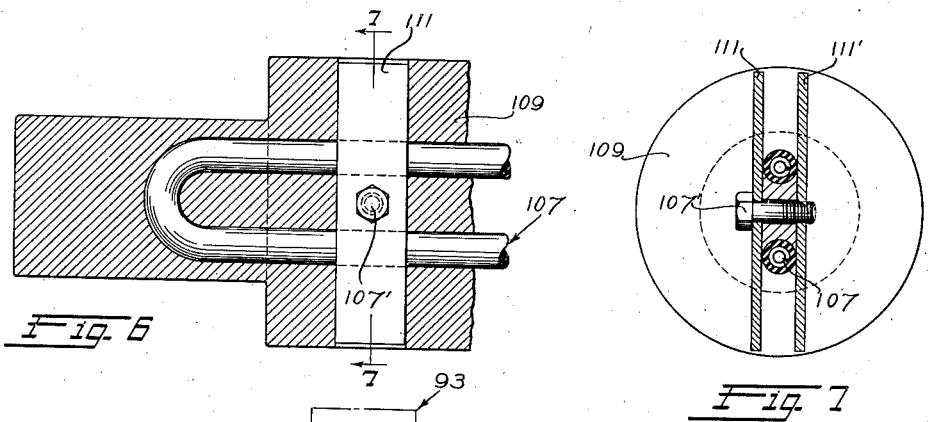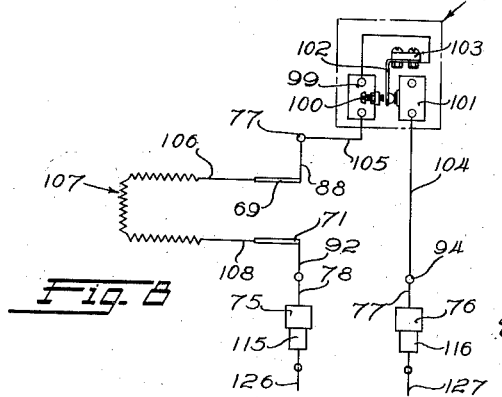

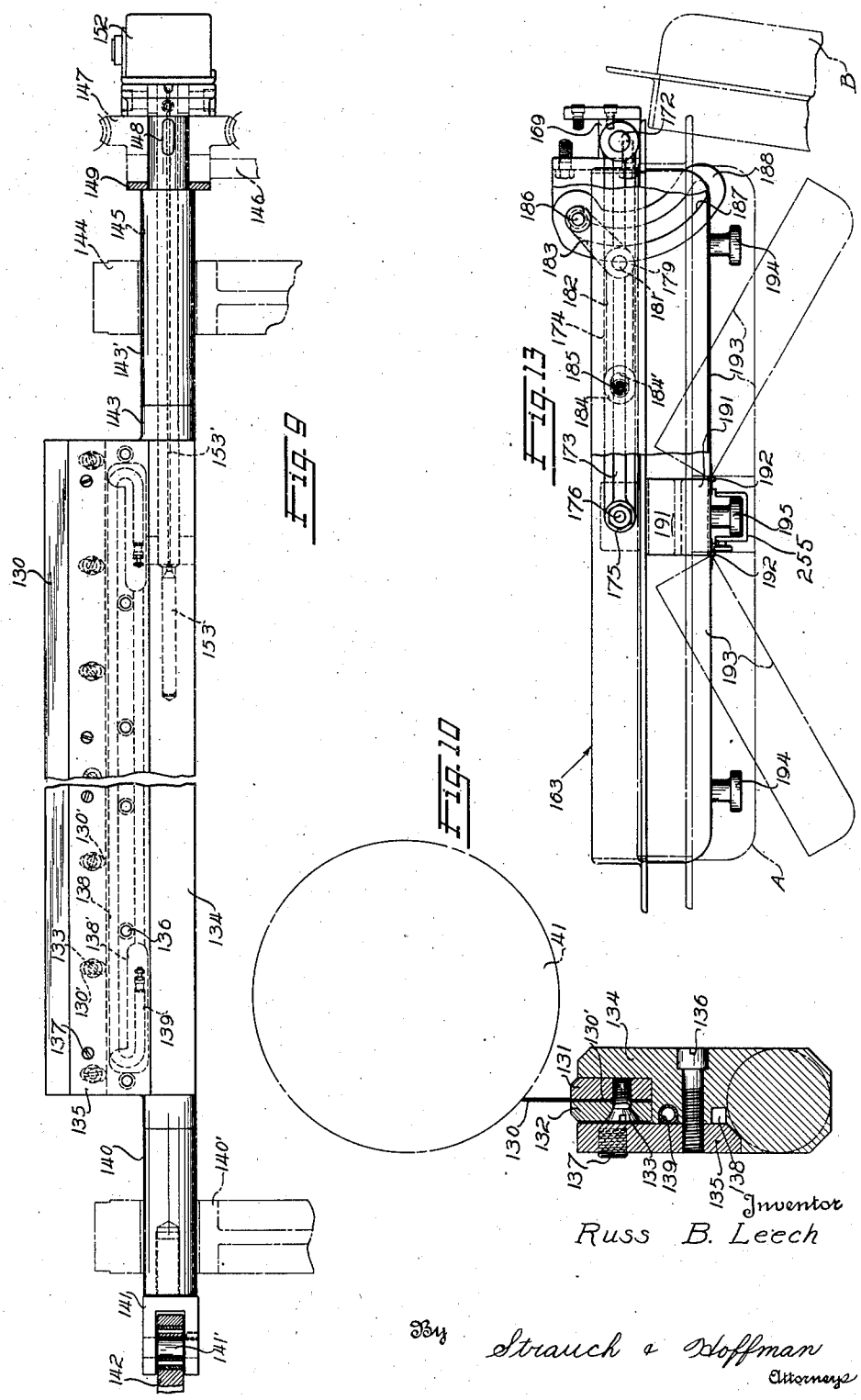

Inventor
Russ B. Leech
By Strauch & Hoffman
Attorneys

Nov. 7, 1944. R. B. LEECH 2,361,950
COATING APPARATUS
Filed April 15, 1941 13 Sheets-Sheet 8
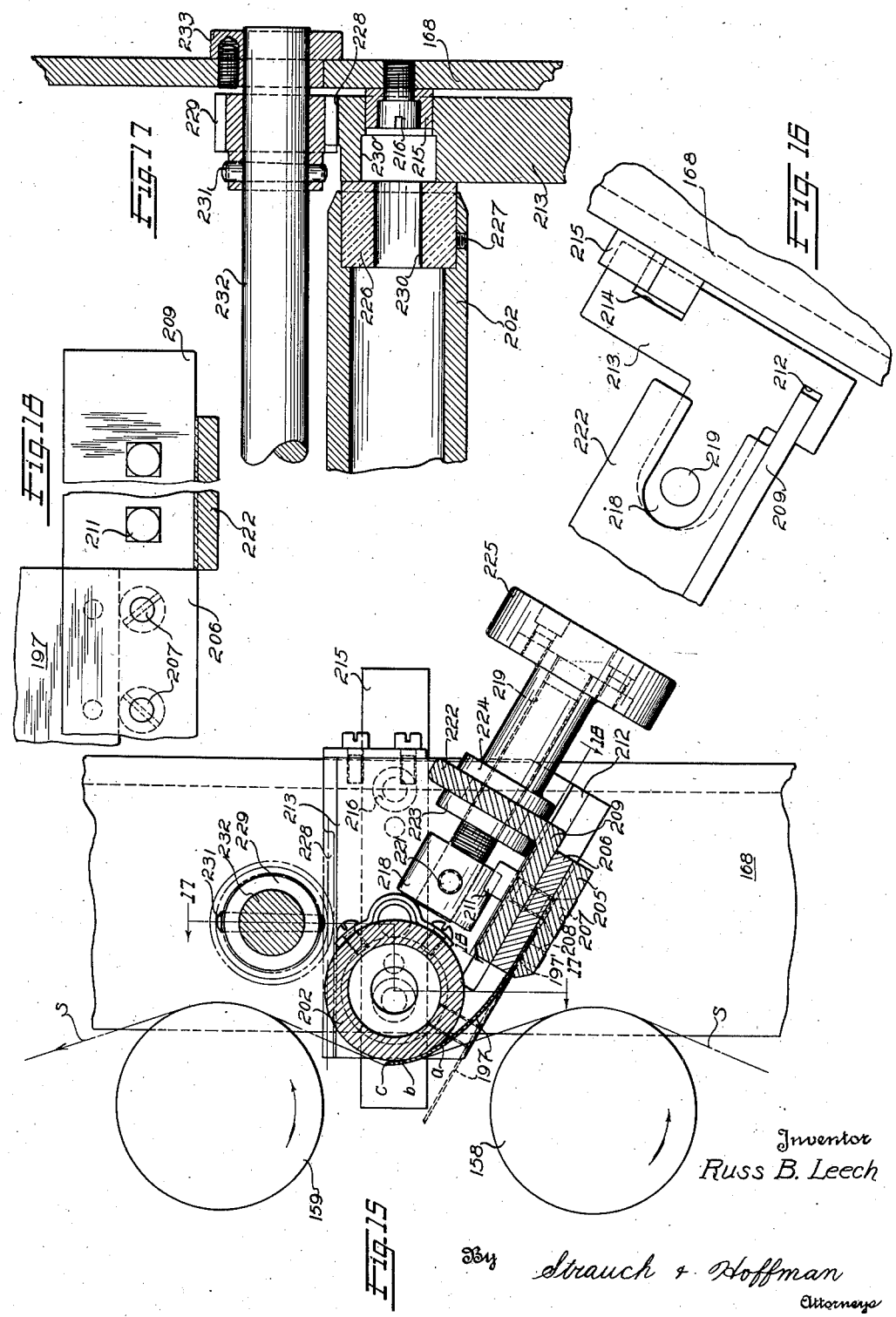
Inventor
Russ B. Leech
By Strauch & Hoffman
Attorneys

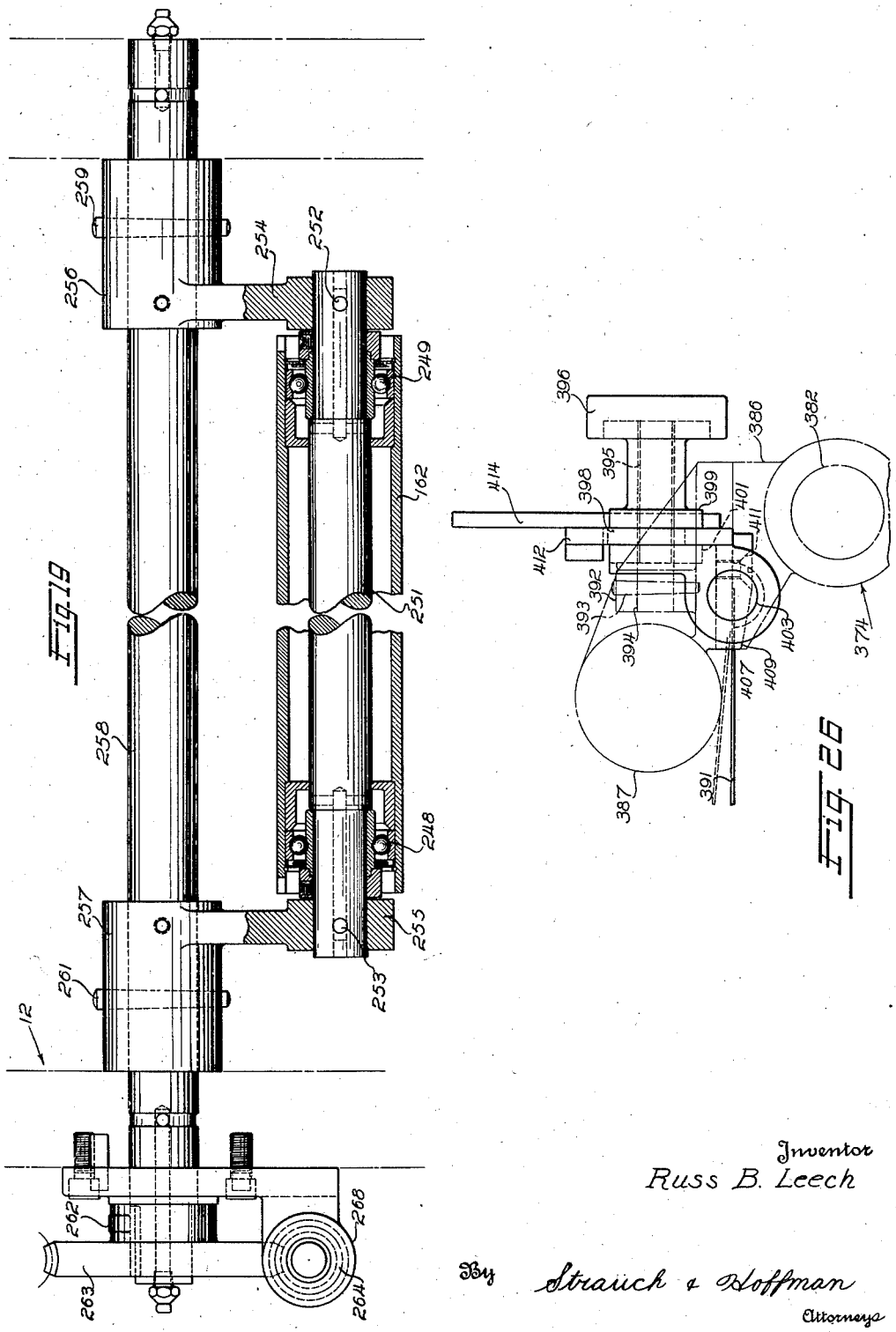

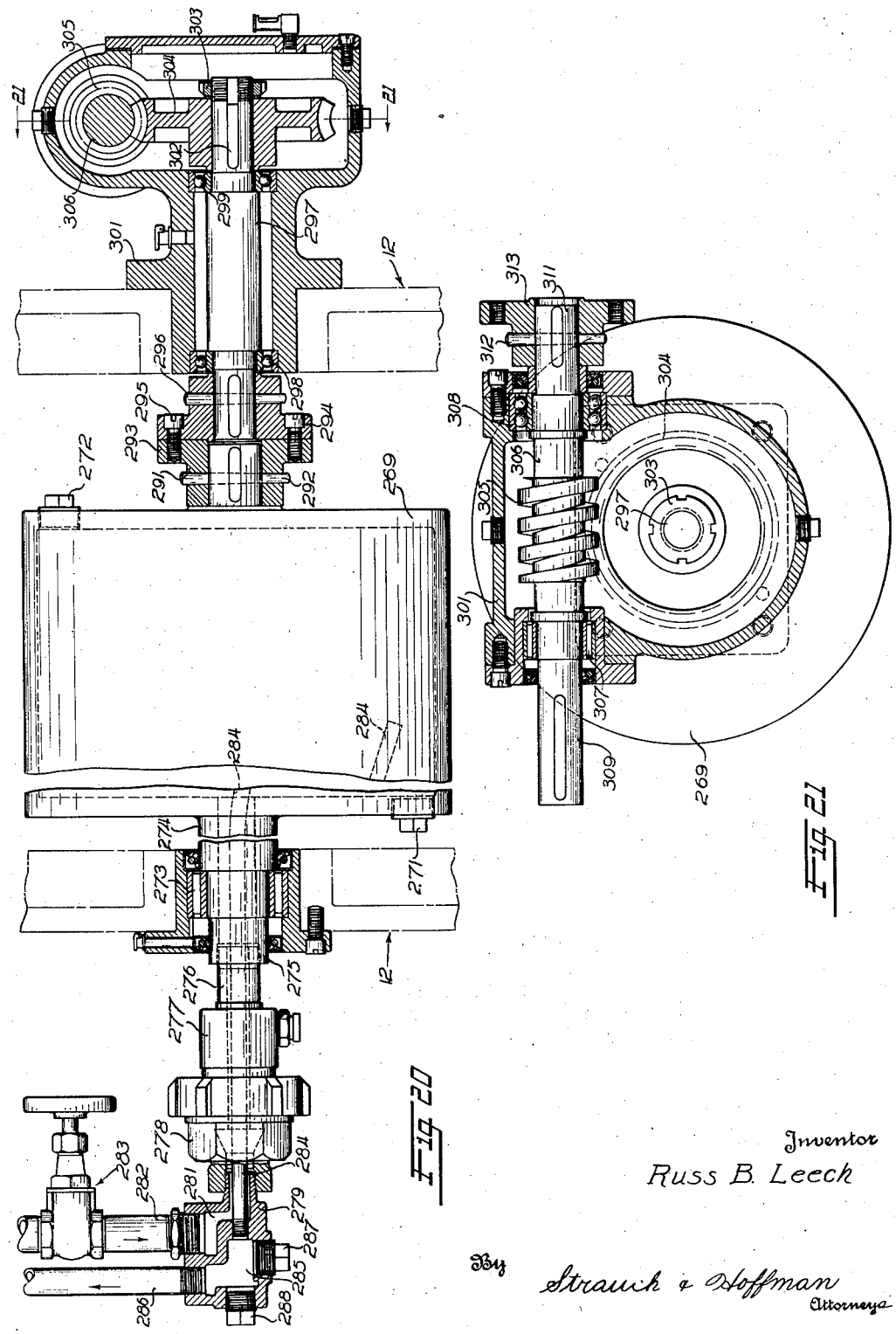

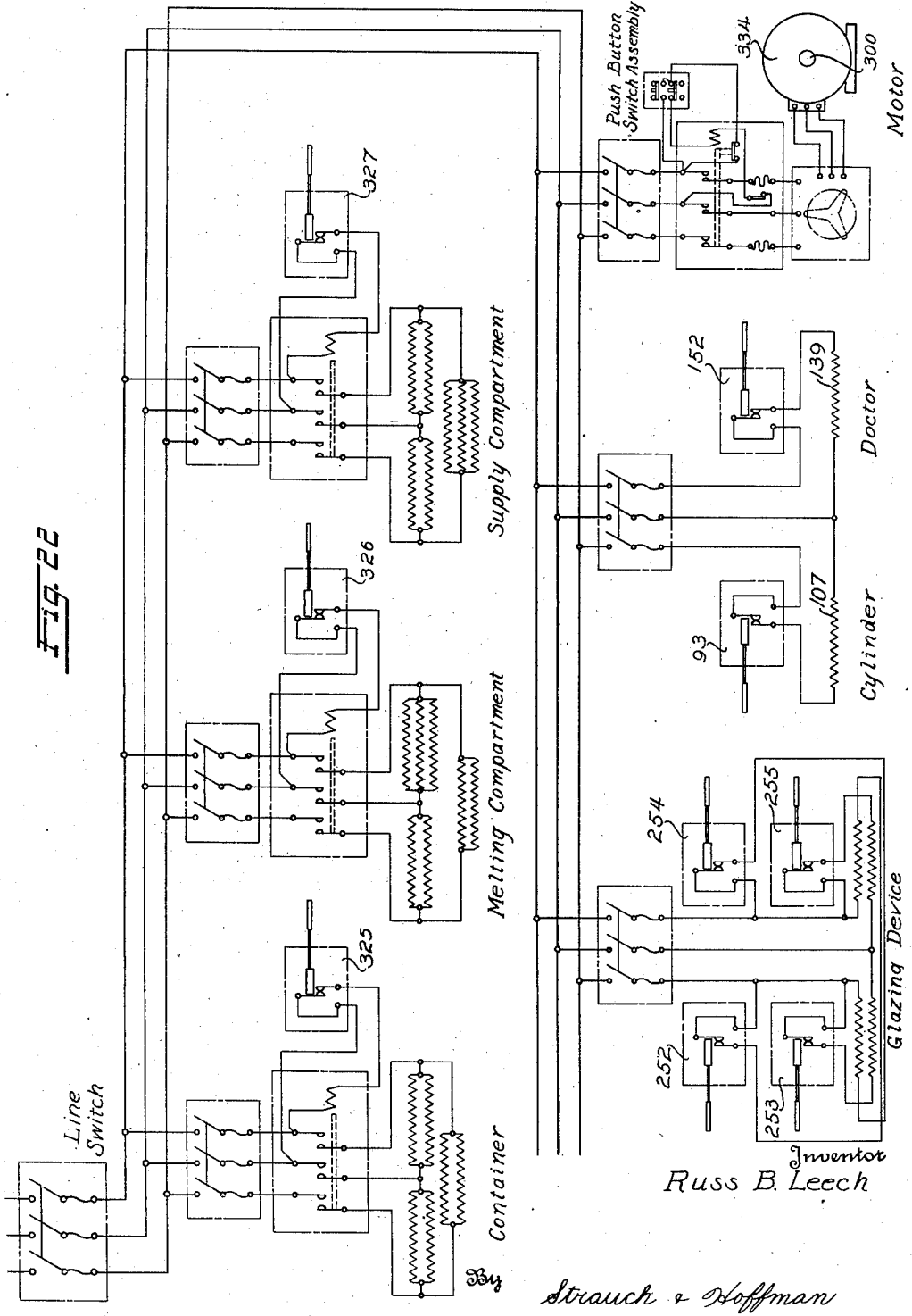

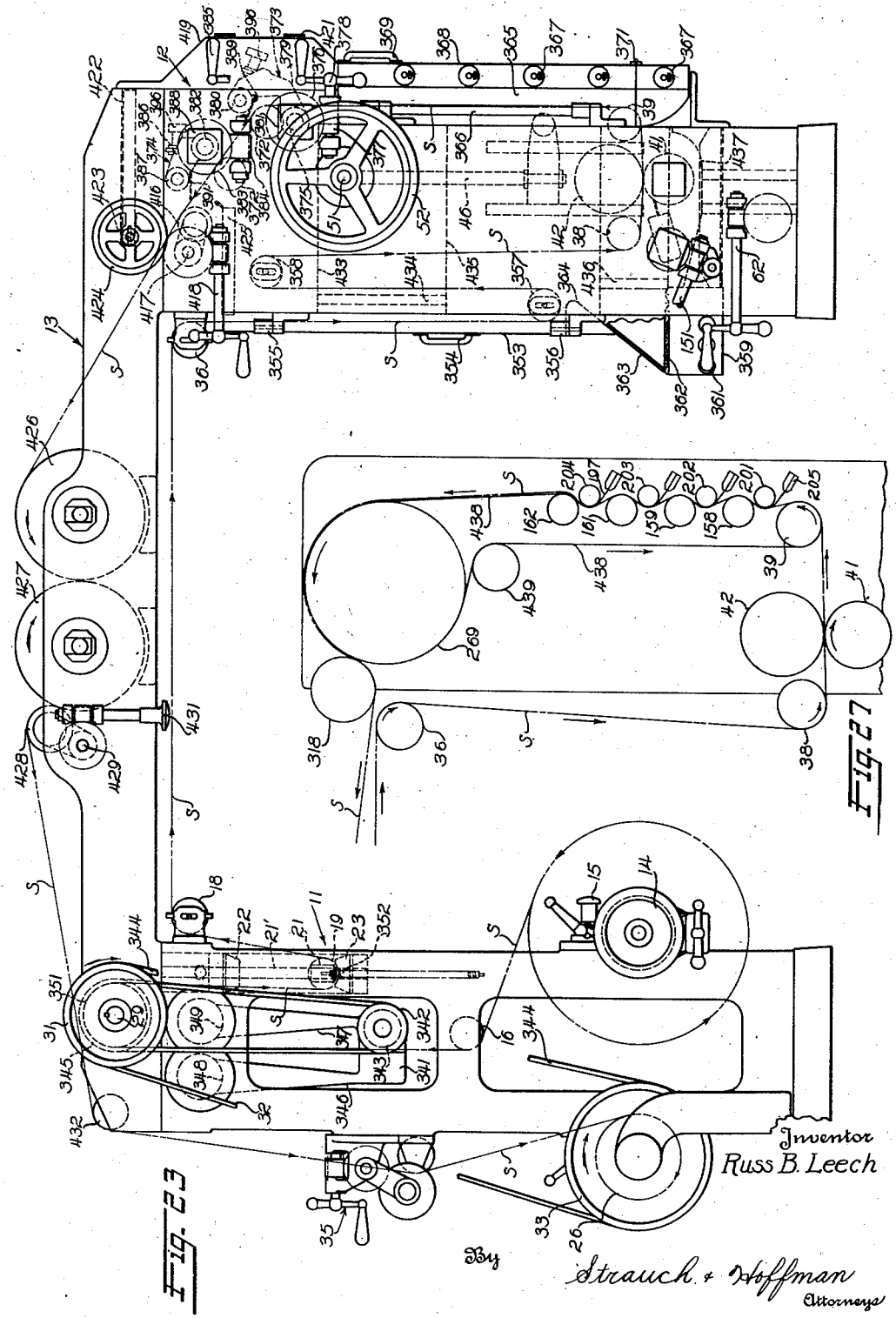

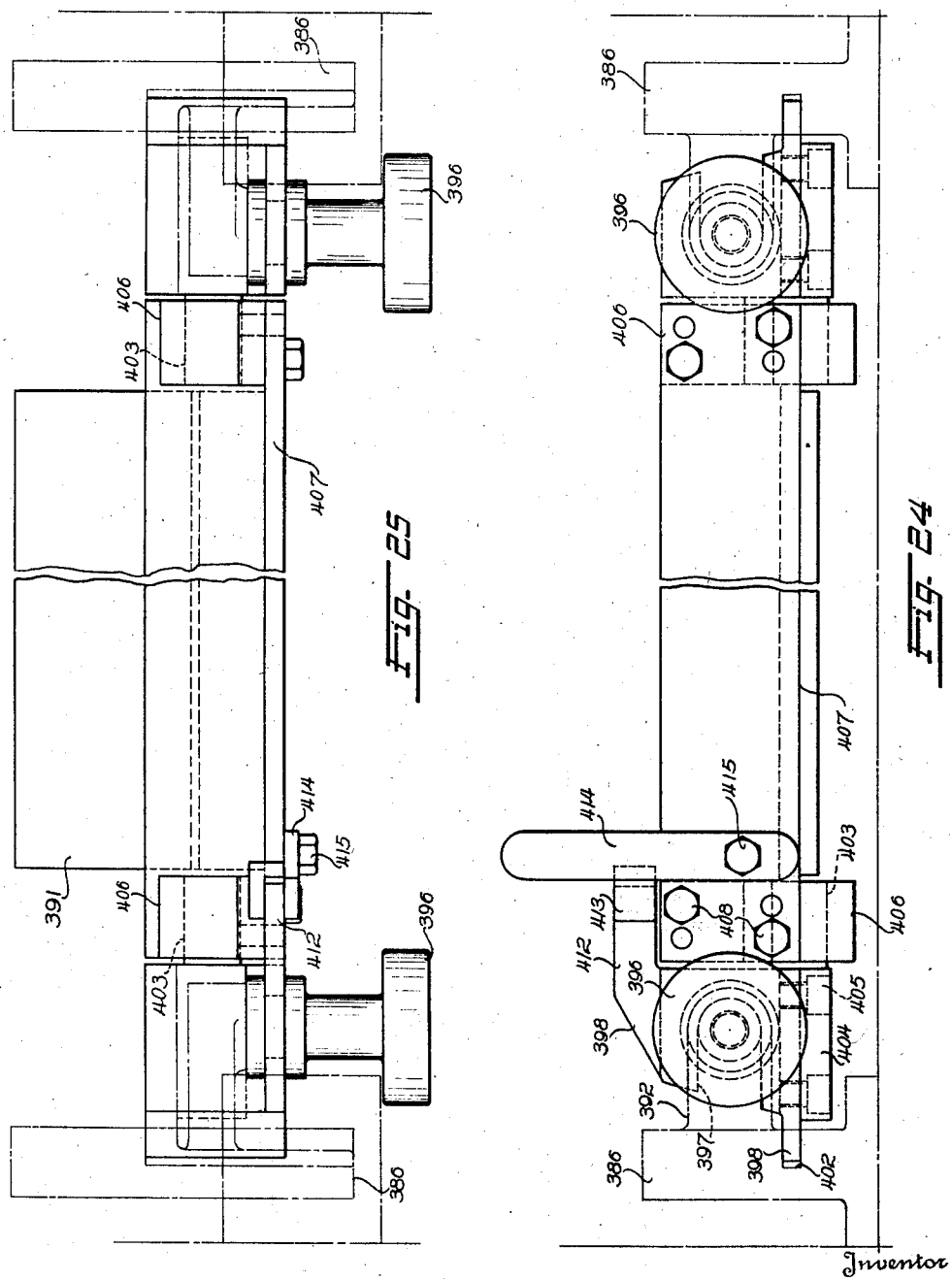

Patented Nov. 7, 1944

2,361,950

UNITED STATES PATENT OFFICE 2,361,950

COATING APPARATUS

Russ B. Leech, Chicago, Ill., assignor to Standard Process Corporation, Chicago, Ill., a corporation of Delaware Application April 15, 1941, Serial No. 388,694

12 Claims. (Cl. 91—33)

This invention relates to an apparatus for coating sheet or web surfaces and the like and is more particularly concerned with apparatus for efficiently applying and distributing thermoplastic coating material upon moving sheet or web surfaces so as to provide thin uniform coatings having desired finish thereupon.

The present invention pertains mainly to improvements upon the apparatus described and claimed in the co-pending application of myself and John D. Murray, Serial No. 260,188, filed March 3, 1939, now United States Letters Patent No. 2,249,089, granted July 15, 1941; and in the co-pending application of John D. Murray, Serial No. 313,135, filed January 9, 1940, now United States Letters Patent No. 2,249,088, granted July 15, 1941.

It is a major object of the present invention to provide novel commercially practical apparatus for speedily and efficiently applying and distributing thermoplastic material upon sheet or web surfaces to provide uniform thin coatings of desired finish thereupon.

A further object of the invention is to provide improved arrangements for depositing thermoplastic coating material upon a sheet surface or the like, and especially improved coating deposit cylinder construction and novel heating and heating control arrangements for maintaining the cylinder surface at a desired temperature. Specifically, adjustable thermostat controlled internal electrical heater units are provided for the deposit cylinder and doctor blade assemblies.

A further object of the invention is to provide novel coating smoothing and glazing blade constructions including a heated medial support for controlling the curvature and temperature of said blade and novel adjustments for the medial support and blades.

A further object of the invention is to provide a novel door assembly for swingably supporting a plurality of coating smoothing blades in such a manner that the blades may be swung into and out of contact with the web surface being smoothed without the sharp edges of the blades shearing the web. Specifically, the door is so mounted as to provide straight line movement of the blades toward or away from the web surface during initial opening and final closing movements of the door so that during such movements, and while they are in contact with the web surface, the blades will be disposed normally to that surface.

A further object of the invention is to provide novel coating apparatus embodying a plurality of spaced flexible coating smoothing blades for successively leveling quantities of coating material deposited upon a web surface or the like wherein the final blade contacting the surface is a glazing blade for providing a desired finish on the surface and is of greater flexibility than the other blades. Specifically, the glazing blade is appreciably thinner than the other blades.

A further object of the invention is to provide coating smoothing apparatus embodying novel adjustments for controlling the angle with which the web surface leaves the final smoothing or glazing blade.

A further object of the invention is to provide improved apparatus for coating webs with thermoplastic material wherein novel arrangements are provided for pre-heating the web prior to coating and for maintaining the deposited coating material soft between deposit and smoothing stations.

A further object of the invention is to provide apparatus for coating paper webs and the like wherein a novel device for removing lint and like impurities from the web surface prior to coating is provided.

A further object of the invention is to provide novel flexible blade arrangements for leveling thermoplastic coating material deposited on a moving web surface wherein the blade may be pre-heated prior to normal operation of the coating apparatus.

A further object of the invention is to provide in a coating machine, novel coating hardening or setting roll arrangements having special internal cooling means, for chilling the coating before the coated web passes to a rewind stand.

Further objects of the invention will presently appear as the description proceeds in connection with the appended claims and the annexed drawings in which:

Figure 1 is a side elevation of the entire coating machine illustrating the manner in which the web is led from the supply reel to the coating apparatus and back to the rewind reel;

Figure 2 is a front perspective view of the coating applying and smoothing apparatus with the door upon which the smoothing blades are mounted swung open;

Figure 3 is a fragmentary view in section illustrating that end of the coating deposit cylinder at which electric current is supplied to the internal heating element, one end of which is also illustrated;

Figure 4 is an end elevation of the apparatus of Figure 3;

Figure 5 is a section taken along line 5—5 of Figure 4 and illustrating further the electrical connections at the end of the deposit cylinder;

Figure 6 is a fragmentary view in section illustrating the end of the heater unit opposite to that shown in Figure 3;

Figure 7 is a section taken along line 7—7 in Figure 6;

Figure 8 is a wiring diagram of the electrical system employed in heating the coating deposit roll;

Figure 9 is an elevation of the doctor blade employed at the coating cylinder, especially illustrating the internal heating unit and manner in which the thermostat switch is mounted;

Figure 10 is a section taken through a portion of the doctor blade illustrating its manner of assembly and the mounting of the heating unit therein;

Figure 11 is a front elevation of the glazing door with the outer hinged panels removed to illustrate the blade supports and adjustments. The blades themselves and many of the control knobs are omitted for the sake of clarity.

Figure 12 is a side elevation of the door of Figure 9 illustrating mainly the medial support bar adjustment controls.

Figure 13 is a top view of the glazing door partly broken away to show the special hinge arrangement for insuring straight line initial opening and closing movement.

Figure 15 is an enlarged section taken along line 15—15 in Figure 11.

Figure 16 is a fragmentary end view illustrating the slidable support employed at each end of each blade.

Figure 17 is a section taken along lines 17—17 of Figure 15 illustrating the mechanism for simultaneously adjusting both ends of the blade and medial support.

Figure 18 is a fragmentary plan view in section along lines 18—18 of Figure 15 illustrating the manner in which the flexible blade holder is supported at each end.

Figure 19 is a front elevation, partly in section, of the swingable roll for determining the angle with which the web leaves the final or glazing blade edge.

Figure 20 is a front elevation partly in section illustrating the coating cooling cylinder drive and fluid circulating system of Figure 1.

Figure 21 is a section taken along lines 21—21 of Figure 20 illustrating further drive arrangements for the cooling roll.

Figure 22 is a wiring diagram illustrating especially the manner in which each of the heated coating apparatus units of Figure 1 is energized.

Figure 23 is a side elevation of a further embodiment of my coating machine illustrating mainly a lint removing device and arrangements for heating the web surface prior to and after coating.

Figure 24 is a front elevation of a modified smoothing or glazing blade mount whereby the blade may be rocked to contact its heater bar for pre-heating prior to operation of the coating apparatus.

Figure 25 is a top plan view of the blade mount of Figure 24.

Figure 26 is an end elevation of the blade mount of Figure 24.

Figure 27 is a diagrammatic representation of a further embodiment of the invention wherein the web is backed by an endless belt at the smoothing and glazing station.

Like reference characters indicate like parts throughout the several views.

Figure 14:
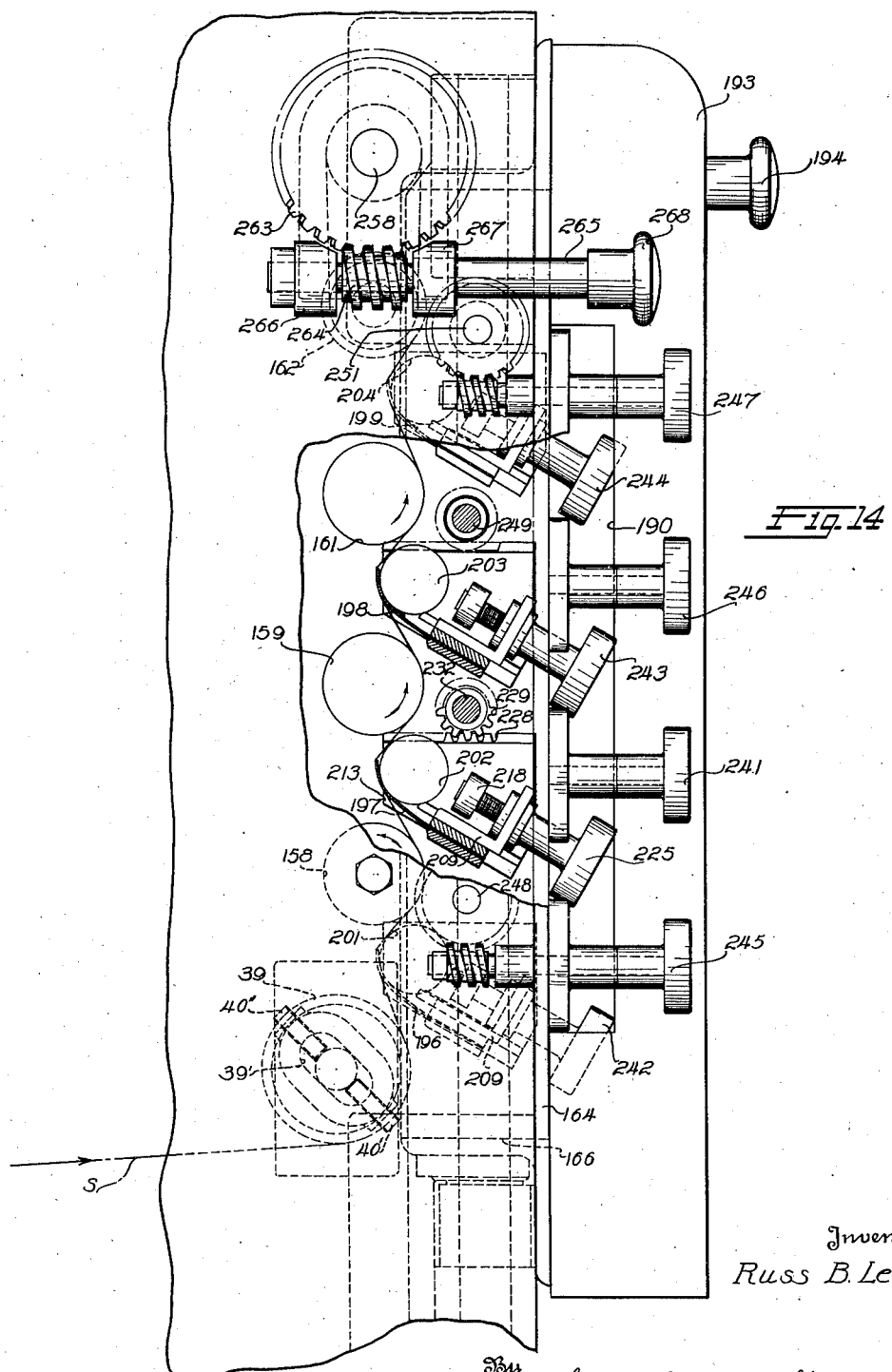
Figure 14 is a side elevation partly cut away and partly in section illustrating in enlarged detail the blade supports and adjustments.

Referring to Figure 1, the coating machine comprises an inverted U-shaped frame consisting of legs 11 and 12 connected by a bridge 13. Leg 11 serves as a reel stand for the web supply reel and the reel for rewinding the coated web; and leg 12 supports the coating applying and smoothing apparatus. Web S may be made of paper, fabric or any desired flexible sheet material and the illustrated machine is especially designed for coating paper or similar porous surface webs.

Above leg 12 of the machine, extends a suitable hood 10 (Figure 2) connected to an exhaust system for collecting and exhausting fumes and vapors escaping from the coating apparatus.

A paper supply reel 14 upon which the web S to be coated is wound is rotatably mounted in a suitable manner adjacent the lower forward end of leg 11 and provided with a brake mechanism of well-known construction actuated by knob 15 for controlling its delivery speed.

Above reel 14, web S travels over an idly mounted guide roll 16, a second idly mounted guide roll 17 at the top of leg 11 and then forms a downward loop between roll 17 and adjacent idler roll 18. Supported within this loop is a weighted roll 19 whose opposite ends are mounted in blocks 21 supported for slidable vertical movement in suitable guides 21', on the opposite sides of leg 11. Weighted roll 19 assists in pulling web S off the supply reel, maintains the loop between rolls 17 and 18 to take care of unstable feed conditions and helps keep the web under even tension during its path from the leg 11 to the coating apparatus on leg 12. Above and below blocks 21 are provided stops 22 and 23, respectively, for limiting vertical movement of roll 19.

The opposite ends of idler roll 18 are rotatable in adjustably mounted blocks 20 at opposite sides of leg 11 and these blocks may be vertically displaced by actuation of knobs 24 threadedly connected thereto. This adjustment changes the size of the web loop and the web direction along bridge 13.

From roll 18, web S passes along the under side of bridge 13 to the coating apparatus on leg 12 which will be later described in detail herein and, after being coated, returns along bridge 13 to pass over a driven rotatable roll 25 supported across the upper rear corner of arm 11. Web S passes from roll 25 downwardly directly to a driven rewind reel 26 supported at the lower rear corner of arm 11.

Roll 25 is connected at one end by means of suitable gearing and coupling mechanism contained in the housing indicated at 27 to an elongated drive shaft 28 extending behind bridge 13 and driven by an electric motor 334. (Figure 22) adjacent the bottom of leg 12 as will later be described. Since the specific nature of this gearing and coupling mechanism is not an essential part of the present invention, further description of the same is deemed unnecessary.

At its other end, roll 25 is provided with a small diameter shaft 29 keyed to a pulley 31 connected by belt 32 to a second pulley 33 fixed on shaft 34 of rewind reel 26. A suitable adjustable belt tightener is provided at 35.

Coating apparatus

At the upper inner corner of leg 12 and substantially horizontally aligned with roll 18, an adjustable rotatable idler roll 36 has its opposite ends supported on vertically adjustable blocks controlled by knobs 37. Leg 12 is provided with hinged rear doors 12' which are suitably apertured to permit passage of the web and which help maintain desired temperature conditions at the coating and smoothing station as will presently appear.

Substantially directly below roll 36 is a rotatable guide roll 38. A second rotatable guide roll 39 is positioned in horizontal alignment with roll 38 and the web passes beneath these guide rolls in a horizontal path with the surface to be coated facing downwardly. Guide rolls 38 and 39 have their opposite end shafts 38' and 39' mounted in suitable elongated guides as shown in Figure 1 and along which they may be displaced by actuation of suitable adjustment screws 40 and 40' to determine the linear path of the web as desired.

Between rolls 38 and 39 is provided a coating material deposit pass comprising a coating deposit cylinder 41 and a vertically aligned impression cylinder 42 which is preferably surfaced with rubber or some other resilient material. Cylinder 41 is driven at a peripheral speed equal to the linear speed of the web to be coated and cylinder 42 is preferably idly supported but rotated at the same rate due to its frictional contact with the web.

For regulating the deposit pressure upon the web as it passes between cylinders 41 and 42, means for vertically adjustably displacing cylinder 42 are provided. End shafts 42' of cylinder 42 are rotatably supported in blocks 43 vertically slidably mounted at opposite sides of leg 12.

Each block 43 is connected by an arm 44 to a boss 45 and the bosses are interconnected by a rigid transverse bar 44'. An externally threaded adjustment shaft 46 has its lower reduced end rotatably disposed within boss 45 at each side of leg 12. Each shaft 46 is provided with rigid collars 46' above and below the boss to prevent axial displacement and to support the boss on the shaft.

At its upper end, each shaft 46 is received within the internally threaded coupling sleeve 47 rigid with a bevel gear 48. Bevel gears 49 at opposite ends of a rotatable transverse shaft 51 mesh with gears 48. At one end, shaft 51 has keyed thereto a hand wheel 52, of large diameter to gain sufficient leverage for lifting the heavy cylinder 42. Upon rotation of hand wheel 52, both shafts 46 are rotated and axially displaced and both ends of cylinder 42 will therefore be simultaneously vertically displaced, and the pressure of cylinder 42 upon the web can thus be regulated to a desired degree.

Any other suitable means for vertically adjusting cylinder 42 with its axis parallel to cylinder 41 may be employed since the specific details of such mechanism do not comprise an essential part of the present invention and further description of the same is unnecessary.

The lower periphery of coating deposit cylinder 41 dips into and below the level of a bath of melted thermoplastic coating material in a pan or container 53 provided with a central overflow spout 54.

Container 53 is mounted upon an adjustable support having depending end posts 55 slidable upon suitable guides at opposite sides of leg 12. Each of these posts 55 is provided with rack teeth 56 for engaging gears 57 at opposite ends of a rotatable shaft 58 which extends between opposite side walls of leg 12 and terminates at one end outside the leg in an enlarged external gear 59 meshed with a rotatable worm 61 on a control handle shaft 62. As control handle shaft 62 is rotated, pan 53 is displaced vertically to regulate the level of the material therein with respect to the coating deposit cylinder or to displace the pan far enough below the coating deposit cylinder so that both are accessible for cleaning or like purposes.

Coating deposit cylinder

Coating deposit cylinder 41 is preferably surfaced the same as that disclosed in my copending application Serial No. 272,526, filed May 8, 1939, wherein the cylindrical periphery engaging the web surface to be coated is provided with a uniform pattern of localized, closely adjacent, shallow grooves or pockets of uniform depth and size which have been accurately cut or otherwise mechanically formed by means of knurling, milling and similar tooling as disclosed in said application. Further description of the coating deposit surface of cylinder 41 is therefore believed to be unnecessary to understand the present invention.

Special means are provided for internally heating cylinder 41 as will now be described and as are illustrated in Figures 3-8, inclusive.

Cylinder 41 is hollow and provided at one end with a suitable drive mechanism (not shown) for rotating it at constant speed. At its other end cylinder 41 has a hollow coaxial cylindrical end shaft 63 of smaller diameter removably secured thereto as by cap screws 64 passing through an integral flange 65 seated in an internal shoulder 65' at the end of cylinder 41.

At its outer end, shaft 63 has its external diameter reduced, as shown in Figure 3, to pass through and be rotatably supported by a suitable roller bearing assembly arranged in a suitable aperture in a side wall of leg 12 and indicated at 66. Bearing assembly 66 is provided with an inner race 66' press fitted on the reduced portion of shaft 63 and a removable cap plate 67 suitably bolted upon the outer wall of leg 12 for ease in disassembly.

Beyond leg 12, the open end of shaft 63 is fitted with a shouldered annular plug 68 of insulating material carrying a pair of spaced hollow electrical binding posts 69 and 71 disposed at either side of a central aperture 72. Plug 68 terminates flush with the outer edge of shaft 63 and is non-rotatably secured therein as by set screw 70.

Surrounding the outer end of shaft 63 is an annular sleeve 73 of insulating material provided intermediate its ends with a raised shouldered portion upon which is press fitted a ring 74 of electrical insulating material separating two metal rings 75 and 76 likewise press fitted upon the sleeve at opposite sides of the shouldered portion.

Rings 74, 75 and 76 are traversed by parallel longitudinal electrical binding posts 77 and 78 which extend beyond the outer end of shaft 63 through an end plate 79 of insulating material. Post 77 is insulated from ring 75 by a sleeve 81 of suitable insulating material, and from ring 76 by a similar sleeve 82. An annular disc of insulating material 83, apertured to fit over the inner ends of posts 77 and 78 insulates terminal nuts on the posts from ring 76.

Post 78 is preferably in threaded engagement with ring 75, but is insulated from ring 76 by a sleeve 84 of suitable insulating material.

The outer end of hollow post 69 abuts against a nut 85 disposed in a suitable aperture in plate 79 and mounted upon an intermediate threaded portion of a bolt 86 passing through an insulating end block 87. The elongated inner tip 80 of bolt 86 is snugly received within hollow post 69. As shown in Figures 3 and 4, a thin metal strap 88, disposed between plate 79 and block 87, connects the outer end of binding post 77 with bolt 86 thus providing an electrical connection between binding posts 69 and 77.

The outer end of hollow post 71 abuts against a nut 89 disposed in a suitable aperture in plate 79 and mounted upon an intermediate threaded portion of a bolt 91 seated in block 87. The inner tip 90 of bolt 91 is elongated to fit snugly within hollow post 71. Bolt 91 and the outer end of binding post 71 are interconnected by a thin metal strap 92 similar to strap 88 thus providing an electrical connection between binding posts 71 and 78.

A thermostat switch box 93 is rigidly mounted upon block 87 at the extreme outer end of shaft 63.

As shown in Figure 5, disc 83, rings 74, 75 and 76, plate 79 and block 87 are longitudinally traversed by a second pair of diametrically spaced binding posts 94 and 95. Binding post 94 is threadedly connected to ring 76 and is insulated from ring 75 by a sleeve of insulating material 96. Binding post 95 is insulated from rings 75 and 76 by sleeves of insulating material 97 and 98 respectively.

Opposite ends of binding posts 77, 78, 94 and 95 are threaded and provided with nuts which when tightened as illustrated in Figures 3 and 5 secure the above-described ring and insulating members tightly together upon the end of shaft 63.

Referring to Figure 8, switch box 93 contains a pair of metal bus plates 99 and 101 and a switch arm 102 mounted on a fibre block 103. An adjustable screw 100, preferably actuated by an external knob 100' (Figure 4) determines the initial open position of arm 102. Bus 101 is connected by a cable 104 to post 94 which in turn is threaded in ring 76, as above-described. Bus 99 is connected by a cable 105 to post 77 and from thence by means of strap 88 and binding post 69 to a cable 106 leading to one end of a heating element 107 disposed within the coating deposit cylinder. The other end of element 107 is connected by a cable 108 to post 71 whose outer end is connected by strap 92 to post 78 which in turn is threaded in ring 75. Thus a complete electrical circuit within the coating deposit roll adapted to be connected to a source of current through rings 75 and 76 is provided.

A cylindrical casting 109, preferably of aluminum, is snugly but removably fitted within cylinder 41 and provided with an integral end extension 110 projecting a substantial distance within shaft 63. Heater element 107 is housed in a flexible rod disposed in a U-shaped passage within casting 109 with its medial bent portion adjacent the drive end of cylinder 41 (Figure 6) and with its closely adjacent terminal legs projecting beyond extension 110 to be connected to cables 106 and 108 respectively (Figure 3).

As illustrated in Figures 6 and 7, casting 109 is grooved at opposite sides to accommodate a pair of flat metal straps 111 and 111' disposed at opposite sides of heater element 107 and clamped thereto by a bolt 107' threaded in strap 111'. Casting 109 may be removed as a unit from cylinder 41 by removal of screws 64 for speedy replacement of a new heater unit should element 107 burn out or be of insufficient capacity for a desired purpose.

Casting 109 and extension 110 are centrally apertured at 112 to receive a hollow tube 113 housing a capillary tube 114 extending between a suitable thermometer bulb imbedded within casting 109 and a suitable pressure responsive element (not shown) connected to switch arm 102.

Electrical energy is supplied to heater element 107 during rotation of cylinder 41 by brushes 115 and 116 bearing on rings 75 and 76 respectively. A rigid brush holder support stud 117 is secured, as by nut 117', to leg 12 from which it projects outwardly parallel to the deposit cylinder axis. An insulating sleeve 118 is made rigid with stud 117 and supports a pair of identical spaced brush holders 119 and 120.

Brush holder 119, as shown in Figure 4, is bifurcated at one end to surround sleeve 118 and is clamped thereto as by bolt assembly 122. Adjacent its other end, holder 119 is socketed to slidably receive brush 115 which is resiliently held against ring 75 as by a flat steel spring 123.

Brush holder 119 is provided with a binding post 124 to which is secured a short flexible cable 125 leading to brush 115 and a cable 126 from one side of the line. Brush 116 is similarly connected to the other line cable 127.

Brush holders 119 and 120 are rotatably adjustable about sleeve 118 upon loosening of bolts 122 and may be secured in selected adjusted position by tightening the bolts.

The entire end assembly of cylinder 41 projecting outwardly of leg 12, including the brush holders and switch box 93, is protected by a suitable housing 128 which is rigid with leg 12 and is provided with an openable door 129 hinged at 130 to permit access to its interior.

Doctor blade assembly

Referring to Figures 9 and 10, the doctor blade comprises a flexible spring steel blade 130, of the type usually employed in intaglio printing apparatus, having a longitudinal edge clamped between opposed metal bars 131 and 132 comprising a stiffening holder therefor. Bars 131 and 132 are secured together by screws 133 which pass through enlarged blade apertures 130' and are tightened only enough to hold the blade against accidental displacement. This loose clamping arrangement together with the enlarged blade apertures permits free expansion of the blade when heated without localized distortion or warping.

Bars 131 and 132, with blade 130 therebetween, are mounted in a shouldered portion of a main doctor blade support 134. A flat plate 135, also seated in a shoulder on support 134, is secured rigidly to the latter as by cap screws 136 and extends along the outer surface of bar 132. Suitable set screws 137 on plate 135 retain the doctor blade holder on its support.

Beneath plate 135 and inwardly of the blade holder, support 134 is provided with longitudinal surface grooves generally forming an elongated oval 138 suitably enlarged at its ends at 138' and containing a heater rod 139 having reversely bent ends lying in said enlarged groove portions 138' to facilitate its insertion and removal and attachment of current carrying wires thereto.

Heater rod 139 is clamped firmly in its groove by engagement with the interior surface of plate 135 as shown in Figure 10.

Doctor blade support 134 is provided at one end with a stub shaft 140 slidably and rotatably supported in and extending through a suitable bearing bracket 140' rigid with leg 12. Shaft 140 has removably secured thereto a bifurcated terminal member 141 carrying a crank pin 141' rotatably connected to one end of a reciprocating crank arm 142. Crank arm 142 may be reciprocated by any suitable mechanism such as that commonly employed for reciprocating doctor blades in printing apparatus and further description of the same is unnecessary to understand the invention.

Doctor blade support 134 is provided at its opposite end with a stub shaft 143 having a tubular end portion 143' slidably and rotatably supported in a suitable bearing bracket 144 rigid with leg 12. Shaft 143' telescopes a solid shaft 145 extending from a rigid bracket portion 146. Shaft 143' and shaft 145 are squared or otherwise shaped to be slidably but nonrotatably interconnected, and shaft 145 provides an additional slidable support for that end of the doctor blade support.

Shaft 145 is formed with an intermediate reduced portion rotatably supported on a rigid bracket 146, and outwardly of bracket 146 carries a gear 147 secured thereto as by key 148. At its inner side, bracket 146 carries an annular thrust member 149 against which the end of shaft 143' abuts during reciprocation of the doctor blade.

Referring to Figure 1, gear 147 meshes with a worm 150 on a control shaft 151 rotatably supported in suitable bearings on leg 12 and provided with a handle 151'.

By the above-described construction the doctor blade is longitudinally reciprocated along cylinder 41 by crank 142, and may be adjustably rotated about the axis of its supporting subshafts by manipulation of handle 151' to determine its pressure and angular relation at the surface of cylinder 41.

Beyond gear 147, shaft 145 has secured thereto a switch box 152 containing a suitable switch mechanism controlled by a thermostat bulb 153 imbedded in holder 134 and connected to said switch mechanism by a flexible capillary tube 153. Since tube 153' lies mainly along the axis of shaft 145, it will not be appreciably affected by reciprocation or rotative adjustment of the doctor blade holder.

The switch mechanism in box 152 is adjustable to obtain a desired temperature of blade 130, preferably equal to the surface temperature of cylinder 41.

*Constant level fountain*

Fluid thermoplastic coating material is fed into container 53 by a supply pipe 154' through which the melted coating material is pumped from a combined melting and storage tank 154 by means of a suitable pump 155 located in a fluid tight compartment in the tank as shown in Figure 1. The pump shaft is provided with a pulley 155' driven by means of a suitable motor driven belt (not shown). Solid unmelted coating material is placed in an upper tank chamber 156 whose bottom comprises a series of heated bars effectively forming an apertured grating or grill 157 which melts the material and permits it to flow downwardly to be collected in tank 154. Pump 155 is operated to deliver coating material to container 53 at the same rate it is used, or at a slightly greater rate to provide a continuous circulation of said material, and excess coating material overflows through spout 54 back into the tank.

*Glazing door*

When web S leaves the coating deposit station, its coated surface contains a uniform pattern of localized, closely adjacent separate ridges or mounds of thermoplastic material which must be leveled to provide a continuous uniform coating over the web surface. This levelling apparatus is illustrated best in Figures 1, 2 and 11–18.

Referring to Figures 1, 2 and 14, a series of spaced, parallel, vertically aligned rolls 158, 159, 161 and 162 are mounted substantially directly above roll 39. Rolls 158, 159 and 161 are simply elongated polished cylinders mounted for free rotation about fixed axes on the frame. Roll 162 is also a polished cylinder but has a special swingable mounting later to be described. These rolls effectively provide a guide for backing web S during coating, leveling and smoothing operations.

Referring to Figures 2 and 11, a glazing door generally designated as 163 comprises a hollow rectangular frame 164 from whose inner edges project top and bottom walls 165 and 166 and side walls 167 and 168, preferably integral therewith.

Leg 12 is provided at one front side edge with upper and lower bearing blocks 169 and 171, respectively, through which extend a rotatable vertical shaft 172. Horizontal door support arms 173 and 174 are non-rotatably secured as by pins 173' and 174' to shaft 172 above blocks 169 and 171 respectively as illustrated in Figure 11.

Blocks 169 and 171 thus support the entire weight of the door for swinging movement about the axis of shaft 172. At its free end, upper arm 173 is provided with a hollow boss 175 surrounding a rotatable pivot pin 176 upstanding from wall 165. The free end of lower arm 174 is provided with a hollow boss 177 fitting over a rotatable pivot pin 178 vertically aligned with pin 176 and projecting downwardly from wall 166.

In this manner the whole glazing door 163 is rockably supported upon a rigid support made up of arms 173 and 174 interconnected by shaft 172; and that rigid support in turn is rotatably supported upon leg 12.

Special linkage for controlling and limiting rocking movement of door 163 about pivots 176 and 178 is also provided.

Intermediate its ends, arm 174 is formed with a hollow boss 179 through which extends a rotatable pin 181 upon whose opposite ends are nonrotatably secured levers 182 and 183 as by pins 182' and 183'. Lever 182 terminates in a boss 184 provided with an elongated aperture 184' slidably and rotatably fitting over a post 185 projecting downwardly from wall 166. Aperture 184' provides a lost motion connection between lever 182 and post 185 for a purpose to be later described.

The outer end of arm 183 has rigidly affixed thereto a downwardly projecting post 186 having a cylindrical roller shank adapted to travel along an arcuate cam recess 187 provided in a plate 188 bolted to the frame below the door. Post 186 terminates in an enlarged button 189 larger than the width of cam slot 187 to prevent the post from being accidentally withdrawn from the cam slot.

Referring to Figure 13, as door 163 is swung open in a counterclockwise direction about the axis of shaft 172, the common axis of pivots 176 and 178 swings in an arcuate path about the axis of shaft 172 but door 163, by operation of cam slot 187 and levers 182 and 183, is caused to simultaneously and compensatively rotate in a clockwise direction about the common axis of pivots 176 and 178 so as to maintain door 163 substantially parallel to the web and give it a substantial straight line movement away from its full line closed position to the partly open position indicated by dotted lines A in Figure 13.

After door 163 has moved normally to the web for a distance of about three inches, post 186 will have reached a portion of cam slot 187 where it is no longer effective to cause further rocking movement of the door and door 163 will merely swing outwardly along with support arms 173 and 174, until fully open position B (Figure 13) is reached, without further clockwise rotation. Post 186 remains in slot 187 and retains door 163 angularly disposed with respect to the support arms.

The reverse operation takes place when the door is closed. The whole assembly swings back about the axis of shaft 172 as a pivot until the dotted line position A of Figure 13 is reached, about three inches away from the web. At this point, post 186 reaches the portion of cam slot 187 where it is again effective to control rotation of the door about the common axis of pivots 176 and 178 and, upon further closing movement, the door is simultaneously rocked about that axis in a counterclockwise direction to maintain it parallel to the web until it reaches the closed full line position of Figure 13. The purpose of this special movement of door 163 will be later described.

As shown in Figure 13, door 163 is provided with a central vertical bridge 191 rigid therewith and provided at opposite side edges with piano hinges 192 for supporting identical cover members or panels 193 which are swingable to an open position when the door 163 is closed as shown in Figure 13 for a purpose to be later described. As shown in Figure 1 each cover 193 is provided along its outer edge with an elongated opening 190 for a purpose later to be described. Door 163 is provided with a central knob 195 (see Figures 1 and 13) for pulling it open, and each closure member 193 is provided with an individual door knob 194 (see Figure 13). Referring to Figure 2, a pivoted latch 190a is adapted to fit over a suitable latch pin 190' on frame 164 to lock the door in closed position.

Smoothing and glazing apparatus

Inner walls 165—168 of door 163 provide a box-like frame for supporting the coating smoothing and glazing blades of the invention. Referring first to Figures 1 and 14, web S during its travel upwardly from roll 39 is contacted between alternate guide rolls by a succession of flexible blades which, when door 163 is closed, are bent by tension of the web over stationary medial support bars underlying the same. Successive blades are indicated at 196, 197, 198 and 199, and their medial support bars at 201—204, respectively.

Blades 196—199 are thin, flexible and springy, preferably being made of a good grade of steel, and have their free web engaging edges ground, honed or otherwise sharpened to provide a straight, smooth, true sharp beveled edge at c (Figure 15). Blade 199 is preferably thinner and more flexible than the other blades for reasons which will presently appear.

All of the blades are identically supported and adjusted and details of the adjustable support for a representative blade 197 will now be described.

Referring to Figures 15–18, one longitudinal edge of blade 197 is clamped in a blade holder comprising a pair of long, rigid flat bars 205 and 206 secured together as by screws 207. Blade 197 is provided with enlarged apertures 197' through which project rigid dowel pins 208 upstanding from bar 206. Screws 207 are tightened only to such degree as to clamp the blade edge relatively loosely but yet firmly enough to prevent accidental displacement. This manner of loosely clamping the blade permits unrestricted expansion of the blade when heated and thereby prevents warping and localized distortion and is substantially the same as that described and claimed in Serial No. 313,135, above-identified, to which reference is hereby made for further detail. If desired, blade 197 may be heat insulated from bars 205 and 206 by suitable interposed liner strips of asbestos or the like.

At opposite ends, the blade holder is supported upon a pair of identical plates 209 rigidly secured to the ends of bar 206 as by bolts 211 (Figure 18). Preferably suitable asbestos heat insulation linings are inserted between plates 209 and bars 206. Bolts 211 are tightened securely and do not interfere with the above-described loose support for the blade. Each plate 209 has its outer edge slidably disposed within a guide groove 212 formed on the surface of a block 213 which in turn is recessed at 214 along its bottom surface to fit over a rectangular guide bar 215 rigidly secured to the adjacent side wall 168 of the glazing door as by bolts 216.

Each block 213 is provided with an upstanding lug 218 from which projects a threaded stud 219 non-rotatably secured thereto as by set screw 221. Each plate 209 is provided with a perpendicularly extending arm 222 which is bifurcated as shown in Figure 16 to pass over stud 219, and the opposite sides of this bifurcated arm are embraced by collars 223 and 224 rigid with a manual knob 225 which is rotatable upon stud 219 by reason of threaded engagement therewith, as illustrated in Figure 15. Upon rotation of knobs 225, blade support members 209 will be shifted bodily along guide 212. Thus each end of blade 197 is identically and independently adjustable.

Medial support bar 202 is parallel to blade 197 and preferably comprises a cylindrical metal tube whose opposite ends are internally shouldered to fit over hollow posts 226 rigid with blocks 213 at opposite walls 167 and 168 (Figure 17). Bar 202 is non-rotatably secured to posts 226 as by set screws 227. Posts 226 are preferably made of heat insulating material to prevent heat from being conducted away from bar 202 to block 213 and the other metallic parts of the machine frame. Bar 202 is preferably provided with a suitable internal electrical heating unit similar to that described above within coating cylinder 41 and since this heating unit may be of any desired type it will not be described in detail. Posts 226 are centrally apertured at 230 in alignment with cooperating passages 230' in blocks 213 for leading current conducting wires to the heating unit.

By the above described construction, blade 197 and its medial support bar 202 are both supported at opposite ends upon slide blocks 213. Means for simultaneously adjusting these slide blocks 213 for shifting the bar and blade as a unit with respect to the web will now be described.

Referring to Figures 15 and 17, block 213 on wall 168 is formed along its upper edge with a rack tooth portion 228, preferably integral therewith, and which meshes with a gear 229 secured as by pin 231 to a rotatable shaft 232. Shaft 232 extends parallel to bar 202 and has one end rotatably supported in a suitable bearing plug 233 fixed in an aperture in wall 168.

At its other end (see Figures 2 and 11) shaft 232 is provided with a fixed gear 230 engaging rack teeth 228 on slide block 213 on wall 167 and extends through a suitable removable bearing assembly 234 in wall 167 and has rigidly secured thereto, as by pin 235, a pinion 236. Pinion 236 (Figures 2 and 12) meshes with a worm 237 rigid with the inner end of a shaft 238 rotatably supported in a bearing member 239 and secured within an aperture in frame 164. A control handle 241 is fastened to the outer end of shaft 238.

Rotation of handle 241 will rotate shaft 232 and, by reason of gears 229 and 230 meshing with racks 228 on opposed block 213, will cause simultaneous displacement of blocks 213 along guide bars 215. The above-described adjustment shifts blade 197 and bar 202 as a unit substantially perpendicularly toward or away from web S.

Each of the other flexible blades 196, 198 and 199 is mounted in the same manner as blade 197 above-described, and provided at opposite ends with individual blade end adjustment control knobs (Figure 14) 242, 243 and 244, respectively, identical with knob 225. This construction is also illustrated in Figure 11, where the blades, door panels and most of the knobs have been eliminated for the sake of clarity, but wherein it is clear that duplicate lugs 218 are provided on each opposed guide block 213 and these lugs are designed to carry knobs 242, 243 and 244 in the same manner as knob 225. As shown in Figure 14, even when door panels 193 are closed, knobs 225, 242, 243 and 244 may be reached by the fingers through openings 190 for adjustment purposes.

Manually controlled knobs 245, 246 and 247 are provided for actuating shafts 248, 249 and 251, respectively, to simultaneously adjust blade 196 and its associated medial support bar 201, blade 198 and its associated support 203 and blade 199 and its associated support bar 204, respectively, as units, in the same manner that blade 197 and bar 202 are adjusted as a unit as above-described.

Since each flexible blade and support bar unit is substantially identical except as to flexibility of the blades as will later be described in detail, further description of the same is not necessary.

When door 163 is in closed position each of the flexible smoothing blades contacts the web S over a substantial end area as illustrated in the case of blade 197 in Figure 15. Under pressure of web S, blade 197 is bent from the dotted line position in Figure 15 to the full line position, wherein it is medially backed or supported by the underlying arcuate surface of bar 202. Blade 197 closely contacts the arcuate surface bar 202 over an intermediate area a—b, and then projects beyond such area of contact with the bar to provide a free flexible end area b—c about one-quarter to one-half an inch along the blade, and then terminates in a free straight smooth edge c over which the coated surface to be smoothed is drawn at a slight angle as it leaves the blade.

As shown in Figure 15, the coated web surface contacts the blade over a portion of area a—b as well as over the area b—c. The relative length of areas a—b and b—c and the areas of contact of the blade with both the medial support bar 202 and the coated surface of the web may be regulated as desired by manipulation of the above-described adjustments controlled by knobs 225 and 241. By regulating the contact area a—b between the blade and its heated support bar, a fine adjustment temperature control for the blade is provided.

The relation of the blade, medial support bar and web surface illustrated at Figure 15 and above-described is substantially the same for the three lower blades 196, 197 and 198 which will hereafter be called smoothing blades. No attempt is made to measurably control or determine the angle at which web S leaves these blades except, of course, to insure that there is at least a slight angle. Upper blade 199, however, is followed by roller 162 (Figures 2 and 14) which is adjustable to accurately determine and set the slight angle with which the coated web surface leaves the blade and thereby determines the glaze or finish finally imparted to the coating. Blade 199 serves both to finally smooth the coating and determine its finish and will be hereinafter called the glazing blade.

Since the three lower blades 196—198 perform the heavier duty work of levelling the deposited quantities of coating material, they are preferably thicker and less flexible than the glazing blade. For smoothing Liquafilm No. 111 which has been deposited upon a paper surface traveling at 200 feet per minute, I have successfully used blades at 196, 197 and 198 which were seven-thousandths of an inch thick, while blade 199 was only four-thousandths of an inch thick.

The adjustable support for roller 162 is best illustrated in Figures 2 and 19. The opposite ends of roller 162, which is a hollow cylindrical tube, are rotatably supported by means of bearing assemblies 248 and 249 upon a solid shaft 251 which extends centrally therethrough and whose opposite ends are secured, as by pins 252 and 253, in apertured bosses at the ends of a pair of parallel arms 254 and 255. Arms 254 and 255 are provided, at their other ends with collars 256 and 257, respectively, through which pass a solid shaft 258 whose opposite ends are supported in suitable bearings upon opposite side walls of leg 12 and which is parallel to roll 162. Collars 256 and 257 are non-rotatably secured to shaft 258 as by pins 259 and 261, respectively.

Shaft 258 projects through the side of leg 12 adjacent hand wheel 52 and has secured thereto, as by set screw 262, an enlarged gear 263. Gear 263 meshes with a worm 264 keyed or otherwise non-rotatably secured upon a control handle shaft 265 which is rotatably supported in suitable bosses 266 and 267 on the outer side of leg 12. A knob 268 is fixed on shaft 265 for manual control of this adjustment. Rotation of knob 268 (Figures 2 and 14) causes shaft 258 to be rotated about its axis and the roller 162 is bodily swung to vary the angle with which the web leaves the terminal edge of blade 199.

Referring to Figures 11 and 13, bridge 191 is provided adjacent each blade and medial support bar unit with separate thermostat switch boxes 250, 250a, 250b, 250c adapted to separately control energization of the heating units within bars 201—204, respectively, in a suitable manner.

Cooling and draw rolls

Above roll 162, the uncoated side of web S passes over the periphery of a large diameter driven cooling roll 269 at the top of leg 12. As shown in detail in Figures 20 and 21, roll 269 comprises a hollow metal cylinder having a polished peripheral surface and diagonally opposite removable outlet plugs 271 and 272 at opposite ends for drainage and like purposes.

Roll 269 is rotatably supported at one end in a suitably heavy combination roller and needle bearing assembly, designated at 273, by means of a hollow stub-shaft 274 which projects from the end of the roll through the bearing and beyond wall 12 to terminate in an open socket 275. Socket 275 is preferably internally tapered and adapted to receive snugly a tapered nozzle 276 at the end of a stationary pipe fitting 277.

Fitting 277 is connected by a suitable coupling 278 to a special chambered fitting 279 having a chamber 281 opening into and aligned with the conduit passage provided by coupling 278, fitting 277, nozzle 276 and hollow shaft 274. Chamber 281 in turn opens into a pipe 282 connected to a source of cooling water, or other fluid, and regulatable by a suitable valve 283. When valve 283 is open, cooling fluid passes through pipe 282, chamber 281, pipe fitting 277, nozzle 276 and shaft 274 into the interior of roll 269.

In order to maintain a substantially uniform temperature at the surface of the cooling roll, means are provided for continuously withdrawing fluid at substantially the same rate as it is introduced. An elongated pipe 284 of copper or some other bendable material, which is capable of retaining its bent shape, has one threaded end tightly fitted in an internal wall of fitting 279 and opening into a chamber 285 which is distinct from chamber 281. Pipe 284 is of relatively small diameter and extends through the various couplings and pipe fittings, through shaft 274, into the interior of the roll without touching any of the moving parts or substantially interfering with the inward flow of cooling fluid. Chamber 285 is connected by a pipe 286 to a suction pump or other suitable water outlet. A pair of drain plugs 287 and 288 are provided for cleaning and repair of chamber 285.

At its other end, roll 269 is provided with a short solid stub-shaft 291 to which is non-rotatably secured, as by pin 292, a flanged coupling member 293 which in turn is secured to a second flanged coupling member 294 as by screws 295.

Coupling member 294 is secured, as by pin 296, upon the reduced end portion of a shaft 297, rotatably supported in spaced bearings 298 and 299 on a gear housing 301 secured in an aperture in wall 12. Beyond bearing 299 and within enlarged portion of housing 301, shaft 297 terminates in a reduced end portion which has secured thereto, as by key 302 and a thrust nut 303, an enlarged gear 304.

Gear 304 is meshed with a worm 305 keyed or otherwise rigidly secured to a shaft 306 supported upon spaced bearings 307, 308 at opposite sides of housing 301. At the front of housing 301, shaft 306 is formed with a reduced end portion 309 to which is keyed or otherwise non-rotatably mounted a drive pulley 310 (Figure 2). Pulley 310 is driven by a belt 337 from a pulley 336 on motor shaft 300 (Figure 2).

At the rear of housing 301, shaft 306 terminates in a reduced end portion 311 to which is secured, as by pin 312, a flanged coupling element 313. Coupling element 313 (Figure 1) is connected to a matched coupling element on shaft 28 for driving the rewind mechanism.

Referring to Figure 2, a normally stationary shaft 315 extends parallel to the surface of roll 269 with its opposite ends supported by slidable blocks 316 mounted in horizontal guides on leg 12. Each block 316 is individually adjustable by manipulation of a threadedly connected manual control knob 317. During normal operation, bar 315 does not touch the coated surface of the web but is spaced therefrom.

At the point where web S is stripped off the cooling roll surface, an idly rotatable draw roll 318 (Figure 1) is positioned with its opposite ends rotatably mounted in a pair of slidable bearing housings 319. Bearing housings 319 are supported in suitable guides on opposite sides of leg 12 and, at each inner side of leg 12, are pivotally connected to blocks 316 by rods 320 which are identical length.

Shaft 315 is provided with rigid eccentric formations 315' rotatable within blocks 316, and one end of shaft 315 extends through the side wall of leg 12 to receive a gear 321 meshed with a worm 322 on a rotatable control shaft 323. Rotation of shaft 323 causes rotation of shaft 315 which by reason of eccentrics 315' effects simultaneous displacement of both blocks 316 in the same direction. Blocks 316 being connected to bearing housings 319 by rods 320, draw roll 318 is bodily shifted toward or from the surface of cooling roll 269 to regulate the draw pressure on the web. Adjustment of either block 316 individually by manipulation of knobs 317 may be effected to locate roll 318 exactly parallel to roll 269 so as to secure uniform pressure between the rolls.

Electrical wiring system

The electrical wiring diagram of the circuit employed in the above-described apparatus is illustrated in Figure 22.

Heater elements for maintaining the melted material within container 53 and supply tank 154 at the desired temperature are controlled by thermostat switches designated at 325 and 327, respectively. The heater elements for grating 157 are controlled by means of thermostat switch 326. Thermostat control switches 252, 253, 254 and 255 are shown as individually connected in circuit with the four heater units in bars 201—204. Each of these four switches is of a conventional type which is adjustable so that the temperature of each bar and the blade in contact therewith can be regulated separately and very closely. Electrical connections for thermostat switches 93 and 152 for controlling energization of rod 107 in coating deposit cylinder 41 and heating element 139 in the doctor blade holder 134 respectively are also illustrated.

At the right hand side of Figure 22 is illustrated, diagrammatically, the push button switch assembly for starting motor 334 which preferably drives all the driven members of the apparatus. Further description of the preferred electrical system, which is believed to be mainly self-explanatory in Figure 22 is deemed unnecessary.

Operation

Web S, which is preferably of paper or like sheet material having a porous surface, is drawn upwardly from supply reel 14 past guide roll 16 and then over rolls 17 and roll 18 at the top of leg 11. Weighted roll 19 supported in the loop in the web between rolls 17 and 18 is designed to maintain even web tension and to dampen out vibrations as above-explained.

After leaving roll 18, web S passes over roll 36 and then downwardly to roll 38 where it again changes its course to travel in a substantially horizontal path between impression cylinder 42 and the coating deposit cylinder 41. Rolls 38 and 39 are adjustable to insure that the web passes between the deposit station in a perfectly straight line with its opposite surfaces substantially tangential to the coating and deposit cylinders. The coating deposit pressure may be regulated by adjustment of cylinder 42. This pressure is usually regulated until it is sufficient to cause all of the coating material to be drawn out of the surface recesses of cylinder 41 but yet is insufficient to emboss or cut the paper.

Cylinder 41 deposits a measured uniform pattern coating of closely spaced mounds or ridges of melted thermoplastic coating material upon the under surface of the web, and this coating tends to solidify almost immediately after deposit. This specific deposit operation is described in detail in the above-mentioned application, Serial No. 260,188 and therefore need not be further described here. It will be understood that any suitable apparatus for depositing measured quantities of coating material in the above manner may be employed in practicing the present invention.

When coating paper traveling at a linear speed of 200 feet per minute with Liquafilm No. 111 which is in liquid state at 250° F., I prefer to maintain the temperature of the deposit cylinder surface and the material in container 53 at about 250° F. by means of the above-described heating units and automatic controls. Bars 157 are preferably maintained at a temperature of about 300° F. to quickly melt the solid material in chamber 156 and the material in tank 154 is maintained at a temperature of at least 250° F.

After leaving the deposit station and passing around roll 39, coated web S is drawn upwardly along guide rolls 158, 159, 161 and 162 in succession.

While the web is being threaded, the machine appears substantially as shown in Figure 2 with the glazing door standing open. After the paper has been properly threaded through the machine, the glazing door is swung to shut position wherein each blade engages the web to take up the slack between alternate guide rolls and is bent by the web back upon its adjacent medial support bar as illustrated in Figure 14.

If door 163 were provided with conventional hinges, the sharp edges of blades 196—199 would engage the web with unevenly distributed pressure during closing of the door thereby probably shearing or otherwise cutting the web.

In my improved apparatus, as above-described, danger of such shearing is prevented by providing door 163 with the special pivotal suport by which it is disposed parallel to the web and moves in a straight line normally thereto during the last three inches of its closing movement. In this manner, blades 196—199 initially engage the web evenly all along their edges which curl upwardly with increasing pressure and glide along the web surface as the door closes to assume the positions illustrated in Figure 14.

Similarly, during initial opening movement, door 163 travels in a straight line normally away from the web for about three inches and the blades are withdrawn without shearing the web. At all times that blades 196—199 are moving in contact with the web surface during swinging of the door, they are traveling generally normal to the web surface and never unevenly engage the same.

With door 163 closed, the machine is started up with the web traveling at slow speed, well below operating speed. The coated surface is thereby drawn successively over the heated smoothing blades 196—199 under tension due to the pull of the draw roll and sufficient heat and pressure is imparted to the coating at each blade so that the solidified ridges or mounds are successively softened and progressively leveled off by each blade. Blades 196—199 are maintained at an appreciably higher temperature than the material at the coating station because they must soften the solidified material very quickly during its passage thereover on the high speed web, but care must be taken not to raise them to such a temperature that the coating will be removed. By employing a plurality of successively acting blades, as above described, I am enabled to carry out the smoothing operations successfully at lower temperatures than would be required for a single blade. As many blades as are felt necessary for a particular purpose may be employed.

In smoothing a deposited coating of said Liquafilm No. 111 on paper, I have discovered it to be desirable to maintain a blade temperature of about double the coating deposit temperature, or about 500° F.

By the time the coated surface reaches blade 199, the ridges and mounds are completely leveled so that blade 199 performs very little additional smoothing. The angle at which the coated surface leaves the free edge of blade 199, however, determines the glaze or finish of the coating, and this angle may be accurately adjusted by manipulating knobs 244, 247 and 268.

Preferably, knob 268 is first rotated to swing roll 162 so that approximately the correct angle is obtained and then knobs 244 and 247 are manipulated to adjust blade 199 until the coated surface leaving the blade edge has the desired finish. This finish can be observed directly by the operator through open panels 193 or above the door.

When the desired finish or glaze has been obtained, the web speed is increased and the next lowest blade 198 is adjusted by means of knobs 243 and 246 until the glaze which has been somewhat destroyed by speeding up the machine is restored on the coated surface leaving blade 199. The initial adjustment of blade 199 is not disturbed during this operation. The web speed is then further increased, if possible, to operating speed. Then blade 197 is adjusted by means of knobs 241 and 225, until the desired finish is again restored on the web surface leaving blade 199, without disturbing the adjustments of blades 199 and 198. Finally, if not already at operating speed, the web is stepped up to operating speed and knobs 242 and 245 are manipulated until the coated surface leaving the edge of blade 199 is again restored to the desired finish without disturbing the adjustment of the other blades.

In the above-described operations, the lower blades 196, 197 and 198 serve solely as smoothing blades to progressively level the ridges and mounds into a thin smooth, uniform coating over the entire web surface. In adjusting these blades, little attention is paid to the precise angle at which the web surface leaves their terminal edges except to insure that it is at least a slight angle, and it is only at the final or glazing blade 199 that care must be taken to accurately regulate the angle at which the coated surface leaves the blade edge. Fiducial marks may be provided for knob 268 to indicate the adjustment.

After leaving the smoothing and glazing station, web S passes over cooling roll 269 which is chilled as above-described to harden and set the coating on the web surface. Web S is then stripped off roller 269 at draw roll 318 and led along the bridge 13 and over roll 25 on the leg 11 to rewind reel 26. For many coatings, I have found it unnecessary to cool roll 269 as the material itself hardens quickly enough without chilling.

The web speed is controlled by the motor 334 and by the brake mechanism at 15 in Figure 1. The web tension is regulated by adjustment of draw roll 318.

The above-described machine is designed to completely and uniformly coat a whole reel of paper in a continuous operation in a minimum of time and with maximum efficiency.

*Further embodiments*

Figure 23 illustrates a coating machine which, except for details and rearrangements of parts to be herebelow described, is substantially the same as that of Figure 1.

Prior to leaving leg 11 of the machine of Figure 23 web S passes through a device for removing lint from the web surface. This device is located directly above roll 16 and comprises a cleaning pass made up of nozzle members 341 and 342 arranged at opposite sides of the web S. Nozzle members 341 and 342 are faced with bristles or like material to brush the passing web surfaces, and brush 342 is also provided with a rotary brush element 343 arranged to contact the web surface to be coated. Brush element 343 is provided with a pulley (not shown) driven by belt 344 from a drive pulley 345 on shaft 29.

Nozzles 341 and 342 are connected by pipes 346 and 347 to suction outlets 348 and 349, whereby lint, dust, dirt or other impurities brushed off the web surface or sufficiently loose to be removed by suction induced by a suitable fan (not shown) connected to the outlets are taken off the web leaving its surface to be coated clean and ready for coating.

Emerging from the suction brushes, web S passes over driven roll 351 on shaft 29, and thence over dampening roll 19 and idler roll 18 as in Figure 1. As shown in Figure 23, roll 19 may be provided at its ends with suitable springs 352 which are under tension when the web is threaded around roll 19 and the machine in normal operation. Springs 352 cooperate with the weight of roll 19 to insure more uniform web feeding operations.

Coating leg 12 in Figure 23 is provided with openable doors 353, corresponding to doors 12' in Figure 1, equipped with handles 354 and top and bottom hinges 355 and 356. Suitable slots (not shown) in the top of doors 353 permit passage of web S into the space within leg 12 enclosed by the doors. Web S, instead of passing direct to roll 38, as in Figure 1, is directed under a lower idler roll 357, then upwardly and over an upper idler roll 358, and then downwardly to pass beneath roll 38. Rolls 357 and 358 are adjustably mounted similarly to roll 38.

This arrangement insures that relatively long loop sections of web S are disposed in the space inwardly of doors 353 prior to coating deposit operations. A heater device comprising a transversely disposed chamber 359 is mounted on leg 12 at the bottom of doors 353 and this device contains a battery of gas burners or other suitable heater units. Chamber 359 is vented at 361 to admit air for combustion at the burners, and the top of chamber 359 is covered by a perforated screen 362.

The lower ends of doors 353 are provided with inclined walls 363 extending over chamber 359. Plates 364, forming continuations of walls 363 carried by the doors, are rearwardly bent at their upper ends for forming a shelf just below roll 357.

Heated air from chamber 359 arises to the interior of coating leg 12 where it pre-heats the uncoated enclosed web traveling between rolls 36 and 38. This pre-heating operation increases the efficiency of the coating deposit operation at roll 41 since there is little or no heat loss to the paper surface during deposit of the melted material.

Plates 364 forms a protective apron which, in the event the web breaks within leg 12, shunts loose ends of the web away from screen 362 and thereby eliminates danger of fire. And even should the web ends fall below plates 364, screen 362 prevents the former from contacting the burner flames.

The front side of leg 12 in Figure 23 is closed by a heavy skeleton door 365, similar to door 163 of Figure 11, carried by a suitable hinge mounting 366. Door 365 may be swung open to expose the coated side of web S for inspection or the like. Door 365 has mounted thereupon a plurality of vertically spaced transverse rows of gas burners or like heater units 367 adapted to provide heat for maintaining the deposited coating on the web surface in a softened condition between the coating deposit station at roll 41 and the coating leveling and smoothing station to be described.

A panel 368 having an operating handle 369 and hinged at its lower end on the door at 371 provides access to burners 367 and cooperates with doors 353 in enclosing leg 12 to retain heat therewithin. The inner surface of panel 368 serves as a reflector for reflecting heat inwardly onto the passing surface of the coated web, or if desired, special polished reflectors are provided for the burners.

Above door 365, web S passes over guide rollers 372 and through a coating smoothing and glazing station comprising adjustable flexible blade assemblies 373 and 374 which embody the structure of Figures 24-26 wherein blade assembly 374 is illustrated in enlarged detail.

As shown in Figure 23 the whole of blade assembly 373 is supported by a transverse rod 375 which has its opposite ends rotatably carried by the side walls of leg 12 and at one end is provided with a gear 376 meshing with a worm 377 on the shaft of a manual control handle 378. Upstanding brackets 379 at opposite ends of rod 375 carry a cylindrical heater bar 380 which is preferably of the same construction and provided with the same heater units and controls as bar 202 above-described. A thermostat switch unit 381 similar to that at 250a in Figure 11 is mounted on the end of rod 375 and connected to control the temperature of the latter.

Similarly the whole of blade assembly 374 is carried by a rotatable transverse rod 382 provided at one end with a gear 383 meshed with a worm 384 on the shaft of a manual control handle 385. Upstanding brackets 386 at opposite ends of rod 382 carry a cylindrical heater bar 387 identical with bar 380. The thermostat switch 388 for bar 387 is carried by the end of rod 382 beyond gear 383.

With reference to Figure 23, blade assemblies 373 and 374 are provided with flexible coating leveling and smoothing blades indicated at 389 and 391, and these blades are identically supported in their assemblies in the manner indicated in Figures 24–26.

Each bracket 386 is formed with an integral projection 392 in which is anchored, as by pin 393, a stud 394 having a threaded shank 395 on which is mounted a manual operating knob 396. Stud 394 projects through a slot 397 in blade support plate 398, and knob 396 is provided with spaced collars 399 and 401 embracing plate 398.

Plate 398 is slidably mounted in a suitable groove 402 in bracket 386 in the same manner that plate 209 is slidable in groove 212 in Figure 16. At its inner end, each plate 398 is provided with a projecting cylindrical stub shaft 403 secured rigidly thereto by cap plate 404 and screws 405. Mounted on each stub 403 is a blade holder block 406 to which opposite ends of a blade support bar 407 are secured as by bolts 408. A flat clamp bar 409 secured to bar 407 as by screws 411 loosely supports blade 391 in the identical manner blade 197 in Figure 15 is supported in its holder.

Blade support bar 407 is thereby rockably supported on stubs 403. In order to lock bar 407 in the position where blade 391 is correctly disposed for normal coating smoothing operations, I provide one plate 398 with an inwardly extending arm 412 adapted to be engaged by a bifurcated clip 413 on a latch 414 mounted on a suitable pivot 415 on bar 407. This locked position is shown in full lines in Figure 25.

The purpose of the above-described rockable mount for blade 391 is to enable the blade to be quickly moved into contact with heater bar 387 for pre-heating the blade prior to smoothing operations. I have discovered that in many instances the blade, which as shown in Figure 25 in full lines, is normally disposed away from the heater bar when not subjected to web tension and is therefore relatively cool, has a tendency to stick to the coating during the initial period of operation of the machine so that coating of the leading end of the web is marred.

In the apparatus of Figure 23, blade 391 is the glazing blade and it is especially important that it be properly heated during the whole operation. Hence this rockable mount is of most importance for the glazing blade, but may be used for blade 389 if desired. If no rockable mount for blade 389 is desired, plates 398 may be rigidly interconnected as in Figures 15–18. Also the above-described rockable blade mount may be used for glazing blade 199 or any of blades 196—198 on door 163.

Manipulation of handles 378 or 385 rocks brackets 379 or 386 respectively about rods 375 or 382, thereby shifting either blade and heater bar combination as a unit toward or from the web to be coated. Manipulation of knobs 396 shifts the associated blade with respect to its heater bar, in the manner and for the reason set forth above in describing manipulation of knob 225 in Figure 15.

Beyond glazing blade 391 the web passes over an idler roll 416 supported to swing about a pivot assembly 417 for regulating the angle at which web S leaves the edge of blade 391. This take-off roll assembly is preferably the same as that illustrated in Figure 19, and is controlled by an operating handle and gear train indicated at 418. Adjustment of roll 416 performs the same function with respect to blade 391 as adjustment of roll 162 performs with respect to blade 199.

The above-described coating smoothing and glazing station is located in the upper part of leg 12 in Figure 23, and is enclosed by an openable end panel 419 hinged at 421 and fitting closely above panel 368. Above this station is a top cover plate 422 having a combined sliding and pivotal mounting at 423. A hand wheel 424 is suitably connected to move plate 422 about its pivot for access to this station from above.

A heat deflecting cover plate 425 is secured rigidly within leg 12 above the web section being pre-heated. Plate 425 provides a restriction within leg 12 which gives a chimney effect and directs heated air arising from chamber 359 and the interior of leg 12 into the smoothing and glazing station, thereby aiding in maintaining uniform temperature conditions throughout the coating operations and reducing the amount of heat required to be supplied by bars 380 and 385.

The above-described heating arrangements within leg 12 for maintaining the deposited coating in softened condition beyond roll 41 and directing hot air into the smoothing and glazing station have enabled me to increase coating speeds and reduce the number of flexible blades for leveling and glazing the coating. In the apparatus of Figure 23, I have found it satisfactory and sufficient to employ only one leveling and smoothing blade prior to the glazing blade. In this two-blade apparatus, I have found it satisfactory to employ a relatively long arc of contact between the blades and the coated web surface, about 0.75 inch, and highly flexible blades only about (0.004") 4 thousandths of an inch thick. The major advantages of employing such increased blade flexibility and long web contact are to adapt the machine to high speed coating and eliminate streaking in the coating.

After leaving roll 416, the coated web passes between a pair of driven water cooled chilling rollers 426 and 427 which serve as draw rollers for feeding the web through the machine. These chilling rollers are smooth surfaced and the web is pressed against the surface of roller 427 to provide drawing traction by a take-off roll 428 swingable about a suitable pivot assembly 429 controlled by handle 431. The mounting for roll 428 is preferably the same as that of roll 162 in Figure 19.

After leaving the chilling rollers which harden and set the coating on the web surface, web S is directed over a guide roll 432 at the top of leg 11 and thence downwardly to rewind reel 28.

In Figure 23, an alternative type of thermoplastic material melting and supplying apparatus is illustrated. An upper tank 433 is provided with heater means for melting normally solid thermoplastic material. Melted material flows from the bottom of tank 433 through a pipe 434 to a lower melt chamber 435 where the material is retained in fluid condition for discharge through pipe 436 to pan 437 in which coating deposit roll 41 is immersed. Gas flames playing on pipes 434 and 436 aid in keeping the material fluid. Pan 437 is the same as pan 53 in Figure 1, and is similarly displaceably mounted as shown.

Figure 27 illustrates a further embodiment of my invention especially adapted for coating continuous webs of inexpensive light weight paper or like material having insufficient tensile strength to withstand the tension to which a web is usually subjected during usual coating smoothing and glazing operations. For accomplishing this result, I provide a flexible endless belt for backing and thereby reinforcing the web and relieving it of tension during its travel through the smoothing and glazing stations.

Such a belt is illustrated at 438 as applied to a coating smoothing and glazing apparatus generally the same as that illustrated in Figure 1, although it will be understood that this phase of the invention is not so limited but can be applied to any coating apparatus employing the principles of my invention.

Belt 438 is endless and is made of a suitable flexible sheet material of high tensile strength having little or no tendency to stretch under tension, and it is of substantially the same width as, or preferably slightly wider than, the web S to be coated. Belt 438 passes over the parallel cylindrical surfaces of guide rolls 158—162, cooling and draw roll 269, a special idling take-up roll 439 journaled at opposite ends on the frame, and adjustable guide roll 39.

When there is no web S in the machine and door 163 is open, belt 438 is relaxed and somewhat loose on its supporting rolls. With door 163 closed and the smoothing and glazing blades operatively contacting the web surface to be smoothed as shown in Figure 27, the looseness in belt 438 is taken up and it is tight along its length. That portion of web S which is coextensive with belt 438 conforms closely to the outer surface of the belt. Belt 438 is selected of such material that there is no relative slippage between the belt and web during coating and glazing operations, but yet permitting the web to assume and follow the belt surface contour when door 263 is being closed. During smoothing and glazing operations there is no slippage between belt 438 and its supporting rollers, and the belt is continuously driven by reason of its frictional engagement with roll 269. Adjustment of roll 39 serves to regulate and control the tightness of belt 438 for desired operating conditions.

By closely underlying the web during smoothing and glazing operations, belt 438 relieves the web of most of the tension incident to such operations, and the apparatus is thereby adapted to coat light weight papers and the like which might tear if subjected to such tension unsupported. Moreover, belt 438 insures uniform and steady surface speed of all of rolls 39, 158—162 and 269 and thereby takes the strain of moving the idler rolls off the web, so that it can be advantageously used in smoothing and glazing webs of any tensile strength.

The automatic temperature controls of the coating deposit apparatus and the smoothing and glazing blades and the exact adjustments provided throughout the apparatus all combine to produce a precision coating machine for applying high grade, perfect coating with a speed and dependability not obtainable in any other coating machine of which I have knowledge. These adjustments and controls enable the machine to satisfactorily apply coating materials of widely different melting points, viscosities and other characteristics.

The above-described apparatus is especially advantageous for applying very thin films of coating material upon porous paper surfaces, so that large areas of paper can be coated very economically and yet be just as well protected as surfaces having coatings of many times the thickness applied by the relatively rough methods in general use prior to the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Web coating apparatus comprising an enclosure, guide means providing a relatively long section of uncoated web within said enclosure prior to coating, a heater below said guide means for pre-heating said uncoated web section, and means within said enclosure adapted to deflect said web away from the heater in the event of web breakage.

2. Apparatus for coating a moving web or like surface with thermoplastic material comprising an enclosure, a deposit station within said enclosure where said material is transferred to said surface, a glazing station spaced from said deposit station for smoothing and leveling said deposited coating, means within said enclosure for pre-heating said moving web prior to the coating operation and means deflecting air heated by said preheating means into said glazing station.

3. Apparatus for smoothing and levelling thermoplastic coating material which has been deposited upon a sheet or web surface comprising a plurality of thin flexible heated blades with which the coated surface is successively contacted under pressure, at least two of said blades being of different flexibility and the final blade to contact said surface being more flexible than any other blade.

4. Coating apparatus comprising an openable door carrying a plurality of flexible smoothing blades for successively contacting a surface upon which coating material has been deposited, individual heating units for each blade, and a separate thermostat for each heating unit for automatically regulating the temperature of each blade.

5. Coating apparatus comprising a flexible blade mounted in a blade holder and having a free end area adapted to contact a surface to be smoothed; rigid means extending parallel to said blade having an arcuate face adapted to underlie and medially support said blade when the latter bends in response to pressure of said surface; movable means supporting opposite ends of said rigid means and means for slidably supporting opposite ends of said blade holder on said movable means; means for adjusting said movable means to simultaneously shift said rigid means and blade holder as a unit toward or away from said surface; and separate means controlling adjustment of said blade with respect to said arcuate face.

6. Coating apparatus comprising a flexible blade held in a blade holder and having a free end area adapted to contact a surface to be smoothed, a rigid means extending parallel to said blade holder having a heated arcuate face adapted to underlie and medially support the blade when the latter bends in response to pressure of said surface, movable means supporting opposite ends of said rigid means, shiftable means for supporting said blade holder on said movable means, and means movably supporting said blade holder on said shiftable means so that the blade may be moved at will into contact with said heated face for pre-heating prior to normal coating operation of said apparatus.

7. Web coating apparatus comprising a flexible blade, a stationary face adapted to serve as a backing for said blade when the latter is flexed by web pressure during coating operations, means for heating said face, and a movable support for said blade whereby the latter may be quickly shifted into contact with said heated face at will so as to pre-heat the blade prior to normal coating operations.

8. Web coating apparatus comprising a flexible blade, a stationary face adapted to serve as a backing for said blade when the latter is flexed by web pressure during coating operations, means for heating said face, a movable support for said blade whereby the latter may be shifted into contact with said heated face at will so as to preheat the blades prior to normal coating operations, and latch mechanism for holding said blade support in the position it occupies during normal coating operations.

9. Coating apparatus comprising a flexible blade, a holder for said blade, a pair of arms on which opposite ends of said holder are movably mounted, a bar having an arcuate face adapted to underlie and support said blade during coating operations having its opposite ends mounted on said arms, and means supporting said arms for simultaneous rocking movement to shift said blade and bar as a unit.

10. Coating apparatus comprising a swingable door having opopsed side walls; blocks slidably mounted on said walls; a flexible blade mounted in a blade holder having its opposite ends supported by said blocks; a rigid bar parallel to said blade having its opposite ends supported by said blocks; a rotatable shaft parallel to said bar and operatively connected to each of said blocks; and means externally of said door controlling rotation of said shaft for simultaneously adjusting said blocks in the same direction to shift said blade and bar as a unit.

11. In a coating apparatus, a reciprocable doctor blade support mounted for rotatable adjustment, an electrical heating unit in said support and a control thermostat for said heating unit mounted on said support.

12. In a thermoplastic coating apparatus, a coating deposit roll, a reciprocable doctor blade for wiping excess material from the surface of said roll, a movable support for said doctor blade, means for heating said doctor blade comprising an electrical element secured on said support, means at one end of said doctor blade support comprising a thermostatically operated switch for controlling the energization of said electrical element for regulating the temperature of said doctor blade, means connected to the other end of said support for reciprocating said blade, and means for adjusting said doctor blade support to vary the pressure of the blade upon the surface of said coating roll.

RUSS B. LEECH.